(12) United States Patent
Jain et al.

(10) Patent No.: US 10,938,739 B1
(45) Date of Patent: Mar. 2, 2021

(54) EFFICIENT BUFFER UTILIZATION FOR NETWORK DATA UNITS

(71) Applicant: Innovium, Inc., San Jose, CA (US)

(72) Inventors: Ajit Kumar Jain, Cupertino, CA (US); Mohammad Kamel Issa, Los Altos, CA (US); Avinash Gyanendra Mani, San Jose, CA (US); Ashwin Alapati, San Jose, CA (US)

(73) Assignee: Innovium, Inc., San Jose, CA (US)

( * ) Notice: Subject to any disclaimer, the term of this patent is extended or adjusted under 35 U.S.C. 154(b) by 4 days.

(21) Appl. No.: 16/186,349

(22) Filed: Nov. 9, 2018

(51) Int. Cl.
*H04L 12/915* (2013.01)
*H04L 12/741* (2013.01)
*H04L 12/891* (2013.01)
*H04L 12/835* (2013.01)

(52) U.S. Cl.
CPC .......... *H04L 47/786* (2013.01); *H04L 45/74* (2013.01); *H04L 47/30* (2013.01); *H04L 47/41* (2013.01)

(58) Field of Classification Search
None
See application file for complete search history.

(56) References Cited

U.S. PATENT DOCUMENTS

| | | | | | |
|---|---|---|---|---|---|
| 5,587,726 | A | * | 12/1996 | Moffat | G09G 5/399 345/539 |
| 6,137,807 | A | * | 10/2000 | Rusu | H04L 12/56 370/412 |
| 2002/0124149 | A1 | * | 9/2002 | Ni | H04L 49/103 711/170 |
| 2005/0025140 | A1 | * | 2/2005 | Deforche | H04L 47/34 370/363 |

* cited by examiner

*Primary Examiner* — Anh Ngoc M Nguyen
(74) *Attorney, Agent, or Firm* — Wong & Rees LLP; Karl T. Rees

(57) ABSTRACT

Approaches, techniques, and mechanisms are disclosed for efficiently buffering data units within a network device. A traffic manager or other network device component receives Transport Data Units ("TDUs"), which are sub-portions of Protocol Data Units ("PDUs"). Rather than buffer an entire TDU together, the component divides the TDU into multiple Storage Data Units ("SDUs") that can fit in SDU buffer entries within physical memory banks. A TDU-to-SDU Mapping ("TSM") memory stores TSM lists that indicate which SDU entries store SDUs for a given TDU. Physical memory banks in which the SDUs are stored may be grouped together into logical SDU banks that are accessed together as if a single bank. The TSM memory may include a number of distinct TSM banks, with each logical SDU bank having a corresponding TSM bank. Techniques for maintaining inter-packet and intra-packet linking data compatible with such buffers are also disclosed.

21 Claims, 13 Drawing Sheets

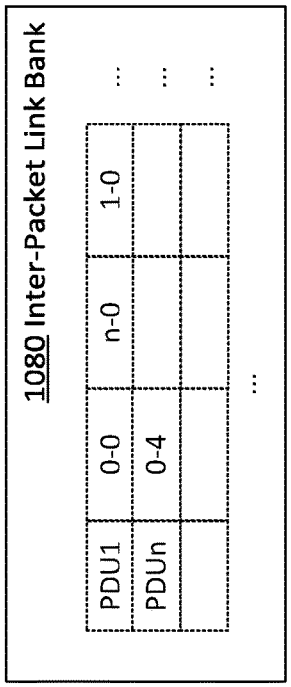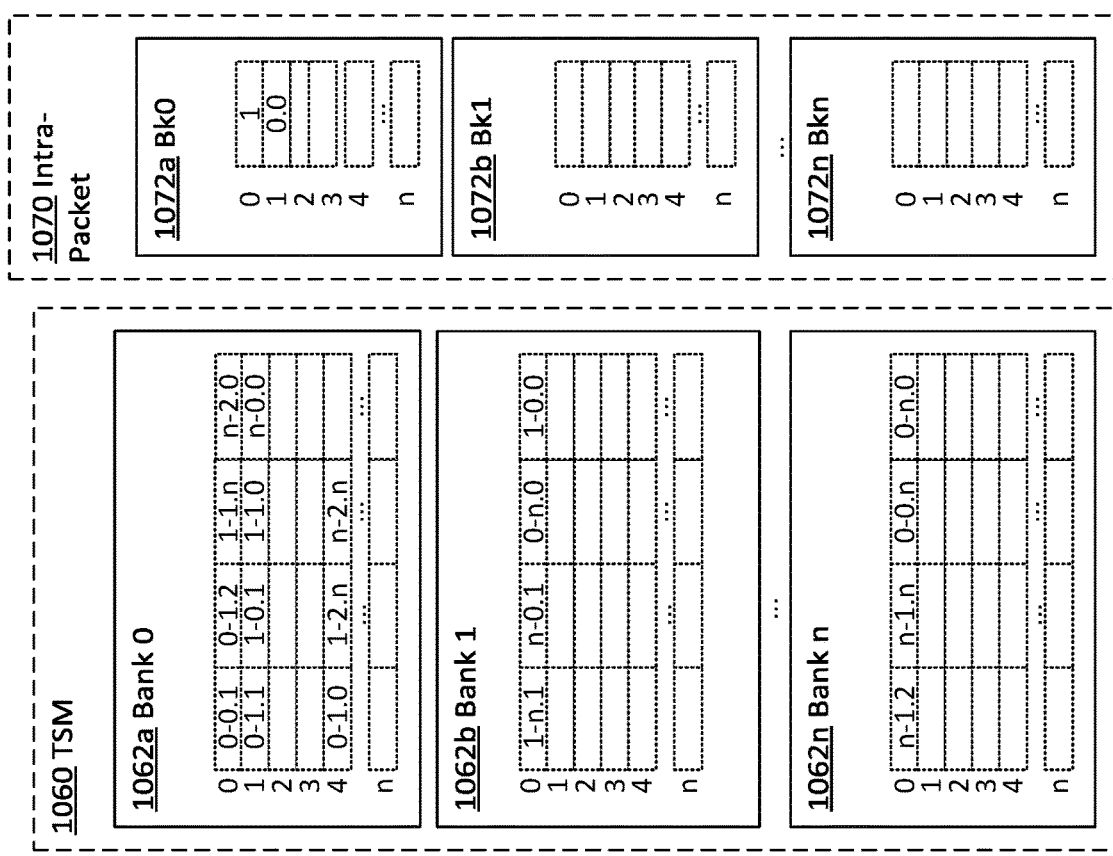
FIG. 10

US 10,938,739 B1

EFFICIENT BUFFER UTILIZATION FOR NETWORK DATA UNITS

TECHNICAL FIELD

Embodiments relate generally to data buffering, and, more specifically, to techniques for buffering data units within a network device.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

A computer network is a set of computing components interconnected by communication links. Each computing component may be a separate computing device, such as, without limitation, a hub, switch, bridge, router, server, gateway, or personal computer, or a component thereof. Each computing component, or "network device," is considered to be a node within the network. A communication link is a mechanism of connecting at least two nodes such that each node may transmit data to and receive data from the other node. Such data may be transmitted in the form of signals over transmission media such as, without limitation, electrical cables, optical cables, or wireless media.

The structure and transmission of data between nodes is governed by a number of different protocols. There may be multiple layers of protocols, typically beginning with a lowest layer, such as a "physical" layer that governs the transmission and reception of raw bit streams as signals over a transmission medium. Each layer defines a data unit (the protocol data unit, or "PDU"), with multiple data units at one layer typically combining to form a single data unit in another. Additional examples of layers may include, for instance, a data link layer in which bits defined by a physical layer are combined to form a frame or cell, a network layer in which frames or cells defined by the data link layer are combined to form a packet, and a transport layer in which packets defined by the network layer are combined to form a TCP segment or UDP datagram. The Open Systems Interconnection model of communications describes these and other layers of communications. However, other models defining other ways of layering information may also be used. The Internet protocol suite, or "TCP/IP stack," is one example of a common group of protocols that may be used together over multiple layers to communicate information. However, techniques described herein may have application to other protocols outside of the TCP/IP stack.

A given node in a network may not necessarily have a link to each other node in the network, particularly in more complex networks. For example, in wired networks, each node may only have a limited number of physical ports into which cables may be plugged in to create links. Certain "terminal" nodes—often servers or end-user devices—may only have one or a handful of ports. Other nodes, such as switches, hubs, or routers, may have a great deal more ports, and typically are used to relay information between the terminal nodes. The arrangement of nodes and links in a network is said to be the topology of the network, and is typically visualized as a network graph or tree.

A given node in the network may communicate with another node in the network by sending data units along one or more different paths through the network that lead to the other node, each path including any number of intermediate nodes. The transmission of data across a computing network typically involves sending units of data, such as packets, cells, or frames, along paths through intermediary networking devices, such as switches or routers, that direct or redirect each data unit towards a corresponding destination.

While a data unit is passing through an intermediary networking device—a period of time that is conceptualized as a "visit" or "hop"—the device may perform any of a variety of actions, or processing steps, with the data unit. The exact set of actions taken will depend on a variety of characteristics of the data unit, such as metadata found in the header of the data unit, and in many cases the context or state of the network device. For example, address information specified by or otherwise associated with the data unit, such as a source address, destination address, or path information, is typically used to determine how to handle a data unit (i.e. what actions to take with respect to the data unit). For instance, an Internet Protocol ("IP") data packet may include a destination IP address field within the header of the IP data packet, based upon which a network device may determine one or more other networking devices, among a number of possible other networking devices, to forward the IP data packet to.

A network device may include any number of internal hardware and/or software components configured to handle the movement of data between processing components within the device and, eventually, out of the device. On account of resource constraints and other issues, network devices often temporarily store significant numbers of data units until the necessary components become available to process the data units. The storage media in which these data units are temporarily stored are often referred to as data buffers (or, simply, "buffers"). It is generally desirable to optimize the components of a network device, including the buffers, so that the device quickly determines where to send and/or store data for processing, and to expediently send and/or store that data to the appropriate destination once determined.

BRIEF DESCRIPTION OF THE DRAWINGS

The present inventive subject matter is illustrated by way of example, and not by way of limitation, in the figures of the accompanying drawings and in which like reference numerals refer to similar elements and in which:

FIG. 3 illustrates different levels of data units that a network node may act upon or with respect to;

FIG. 10 illustrates examples of a multi-banked TSM, intra-packet memory, and inter-packet memory in which linking data for SDU buffers may be stored using TDU indirection;

DETAILED DESCRIPTION

Figure 1:
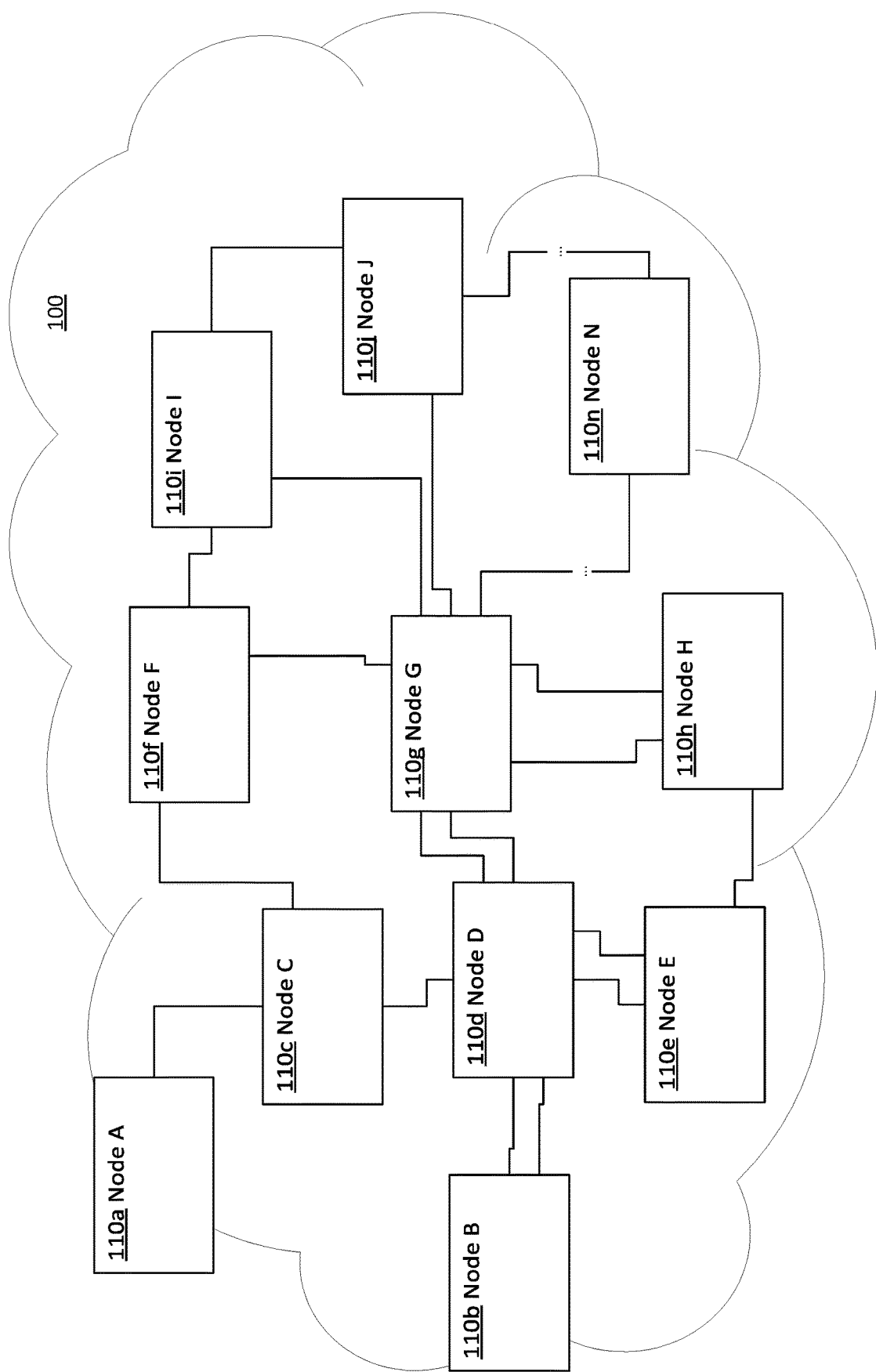
FIG. 1 is an illustrative view of various aspects of an example networking system in which the techniques described herein may be practiced.

In the following description, for the purposes of explanation, numerous specific details are set forth in order to provide a thorough understanding of the present inventive subject matter. It will be apparent, however, that the present inventive subject matter may be practiced without these specific details. In other instances, well-known structures and devices are shown in block diagram form in order to avoid unnecessarily obscuring the present inventive subject matter.

Embodiments are described herein according to the following outline:

1.0. General Overview
2.0. Structural Overview
2.1. Data Units
2.2. Network Paths
2.3. Network Device
2.4. Ports
2.5. Packet Processors
2.6. Buffers
2.7. Queues
2.8. Traffic Management
2.9. Forwarding Logic
2.10. Efficient Buffering Mechanisms
2.11. Miscellaneous
3.0. Functional Overview
3.1. Enqueue Process
3.2. Dequeue Process
4.0. Example Embodiments
5.0. Implementation Mechanism—Hardware Overview
6.0. Extensions and Alternatives 1.0. GENERAL OVERVIEW Approaches, techniques, and mechanisms are disclosed for efficiently buffering data units within a network device. A component configured to buffer data units within the device, such as a traffic manager or other suitable component, receives Transport Data Units ("TDUs"), which are sub-portions of Protocol Data Units ("PDUs"). Rather than buffer an entire TDU together, the buffering component divides the TDU into multiple Storage Data Units ("SDUs") that can fit in SDU buffer entries within physical memory banks. A TDU-to-SDU Mapping ("TSM") memory stores TSM lists that indicate which SDU entries store SDUs for a given TDU.

According to an embodiment, the physical memory banks in which the SDUs are stored may be grouped together into logical SDU banks that are accessed together as if a single bank. The TSM memory includes a number of distinct TSM banks, with each logical SDU bank having a corresponding TSM bank. Although the SDUs of a TDU may be stored in any of the logical SDU banks, the logical SDU bank in which the first SDU of the TDU is stored may be "assigned" to the TDU for purposes of storing and locating various metadata. Thus, the TSM list for a TDU is stored in the TSM bank that corresponds to the logical SDU bank in which the first SDU of the TDU is stored. In some embodiments, the TDU is assigned a TSM entry address that has a same or corresponding address as the SDU entry that stores the first SDU. In other embodiments, the TSM entry address is selected through other suitable means. In any event, the TSM list is stored in the TSM entry at the assigned address.

According to an embodiment, a PDU may have one or more intra-packet link lists that link TDUs belonging to the PDU. For example, there may be separate intra-packet link lists for each logical SDU bank, linking only the TDUs assigned to the corresponding logical SDU bank. The intra-packet link list may take the form of a chain of intra-packet entries in an intra-packet linking bank. Each logical SDU bank may have its own intra-packet linking bank. The intra-packet entries have addresses that directly correspond to the TSM entry addresses, and thus the assignment of a TSM entry address for the TDU also constitutes the assignment of an intra-packet entry address for the TDU. The intra-packet entry whose address is assigned to a given TDU may store a pointer to the address of the intra-packet entry assigned to the PDU's next TDU that is assigned to the corresponding logical SDU bank.

Using the described memory architectures and buffering techniques, among other aspects, data units may be buffered more efficiently. For example, in systems where the TDU is buffered as a whole unit, a significant amount of buffer space may be wasted storing small TDUs that do not come close to the maximum size of a TDU. For instance, if the maximum TDU size is 2048 bits, the width of a TDU buffer entry capable of buffering the whole TDU must be 2048 bits. If a TDU is only 1 bit in size, then storing the TDU in a TDU buffer entry essentially wastes 2047 bits of memory. By contrast, by subdividing the TDU into smaller SDUs, buffer entries may be significantly smaller and thus less likely to waste a significant amount of memory when an SDU is smaller than the size of a buffer entry. Additionally, dividing a TDU into SDUs may achieve other advantages, such as speed-up effects from parallel reading or writing of data to or from buffer memory banks.

In other aspects, the inventive subject matter encompasses computer apparatuses and/or computer-readable media configured to carry out the foregoing techniques.

2.0. STRUCTURAL OVERVIEW

FIG. 1 is an illustrative view of various aspects of an example networking system 100, also referred to as a network, in which the techniques described herein may be practiced, according to an embodiment. Networking system 100 comprises a plurality of interconnected nodes 110a-110n (collectively nodes 110), each implemented by a different computing device. For example, a node 110 may be a single networking computing device, such as a router or switch, in which some or all of the processing components described herein are implemented in application-specific integrated circuits (ASICs), field programmable gate arrays (FPGAs), or other integrated circuit(s). As another example, a node 110 may include one or more memories storing instructions for implementing various components described herein, one or more hardware processors configured to execute the instructions stored in the one or more memories, and various data repositories in the one or more memories for storing data structures utilized and manipulated by the various components.

Each node 110 is connected to one or more other nodes 110 in network 100 by one or more communication links, depicted as lines between nodes 110. The communication links may be any suitable wired cabling or wireless links. Note that system 100 illustrates only one of many possible arrangements of nodes within a network. Other networks may include fewer or additional nodes 110 having any number of links between them.

2.1. Data Units

While each node 110 may or may not have a variety of other functions, in an embodiment, each node 110 is configured to send, receive, and/or relay data to one or more other nodes 110 via these links. In general, data is communicated as series of discrete units or structures of data represented by signals transmitted over the communication links.

Different nodes 110 within a network 100 may send, receive, and/or relay data units at different communication levels, or layers. For instance, a first node 110 may send a unit of data at the network layer (e.g. a TCP segment) to a second node 110 over a path that includes an intermediate node 110. This unit of data will be broken into smaller units of data at various sublevels before it is transmitted from the first node 110. These smaller data units may be referred to as "subunits" or "portions" of the larger data unit.

For example, a TCP segment may be broken into packets, then cells, and eventually sent out as a collection of signal-encoded bits to the intermediate device. Depending on the network type and/or the device type of the intermediate node 110, the intermediate node 110 may rebuild the entire original data unit before routing the information to the second node 110, or the intermediate node 110 may simply rebuild certain subunits of data (e.g. frames and/or cells) and route those subunits to the second node 110 without ever composing the entire original data unit.

When a node 110 receives a unit of data, it typically examines addressing information within the unit of data (and/or other information within the unit of data) to determine how to process the unit. The addressing information may be, for instance, an Internet Protocol (IP) address, MPLS label, or any other suitable information. If the addressing information indicates that the receiving node 110 is not the destination for the data unit, the receiving node 110 may look up the destination node 110 within receiving node's routing information and route the data unit to another node 110 connected to the receiving node 110 based on forwarding instructions associated with the destination node 110 (or an address group to which the destination node belongs). The forwarding instructions may indicate, for instance, an outgoing port over which to send the unit of data, a label to attach the unit of data, etc. In cases where multiple paths to the destination node 110 are possible, the forwarding instructions may include information indicating a suitable approach for selecting one of those paths, or a path deemed to be the best path may already be defined.

Addressing information, flags, labels, and other metadata used for determining how to handle a data unit are typically embedded within a portion of the data unit known as the header. The header is typically at the beginning of the data unit, and is followed by the payload of the data unit, which is the information actually being sent in the data unit. A header is typically comprised of fields of different types, such as a destination address field, source address field, destination port field, source port field, and so forth. In some protocols, the number and the arrangement of fields may be fixed. Other protocols allow for arbitrary numbers of fields, with some or all of the fields being preceded by type information that explains to a node the meaning of the field.

A traffic flow is a sequence of data units, such as packets, from a source computer to a destination. In an embodiment, the source of the traffic flow may mark each data unit in the sequence as a member of the flow using a label, tag, or other suitable identifier within the data unit. In another embodiment, the flow is identified by deriving an identifier from other fields in the data unit (e.g. a "five-tuple" combination of a source address, source port, destination address, destination port, and protocol). A flow is often intended to be sent in sequence, and network devices are therefore typically configured to send all data units within a given flow along a same path to ensure that the flow is received in sequence.

Figure 3:
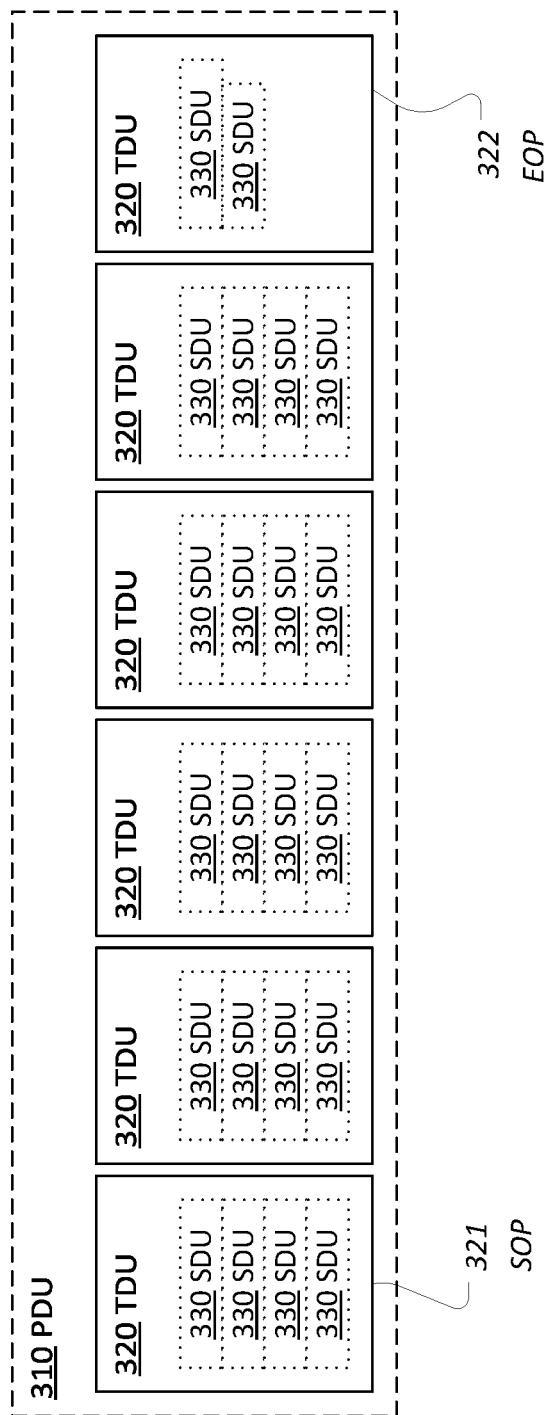

A node 110 may operate on network data at several different layers, and therefore view the same data as belonging to several different types of data units. FIG. 3 which illustrates different levels of data units that a network node may act upon or with respect to, according to an embodiment.

At a higher level, a node 110 may view data as belonging to protocol data units ("PDUs") 310 of a certain type, such as packets or data units at any other suitable network level. The node 110 need not necessarily ever assemble the data in a PDU 310 together, but rather may in an embodiment act upon constituent portions of the PDU 310, which may be linked together by identifiers, linked lists, or other suitable constructs. These portions are referred to herein as transport data units ("TDUs") 320. For instance, if the PDU 310 is a packet, the TDU 320 might be one or more cells or frames. The first TDU 320 in a PDU 310 is referred to as the start-of-packet ("SOP") 321, while the last TDU 320 in the PDU 310 is referred to as the end-of-packet ("EOP") 322.

Generally speaking, the TDU is the largest contiguous unit of data that certain internal components of a node 110 are configured to communicate between each other in a given period of time. For instance, a node 110 may have a traffic manager that is capable of receiving no more than a single TDU 320 from each interface during a single clock cycle. Additionally, in an embodiment, the contiguous portions of data sent by each port of a node 110 in a given period of time may be no larger than a TDU 320. In an embodiment, each TDU 320 is of a fixed size, except for the last TDU 320 in a PDU 310, which may be of a size less than the fixed size.

In an embodiment, for storage purposes, such as buffering, a TDU 320 may further be divided into storage data units ("SDUs") 330. In an embodiment, a SDU 330 is the largest contiguous portion of data that may be stored in a physical buffer entry. In other words, the maximum size of a SDU 330 is the same as the maximum size of a physical buffer entry. In an embodiment, the maximum number of SDUs 330 in a TDU 320 is fixed. However, an EOP TDU 322 may have less than this number of SDUs 330. Moreover, the last SDU 330 in a TDU 320 (e.g. the EOP TDU 322) may be smaller than maximum SDU size.

In an embodiment, TDU and SDU boundaries may be relative to the component acting upon the data. That is, for example, a node 110 whose traffic manager is configured to use TDUs of a first size and SDUs of a second size may further include other components configured to communicate or buffer data units of sizes other than the first size and the second size.

For convenience, many of the techniques described in this disclosure are described with respect to embodiments where the PDUs are IP packets in a L3 (level 3) network, and the TDUs are the constituent cells and frames thereof in an L2 (level 2) network, in which contexts the described techniques have particular advantages. It will be recognized, however, that these techniques may also be applied to realize advantages in routing other types of data units conforming to other protocols and/or at other communication layers within a network. Thus, unless otherwise stated or apparent, the techniques described herein should also be understood to apply to contexts in which the PDUs, TDUs, and SDUs are of any other types of data structures communicated across a network, such as segments or datagrams. That is, in these contexts, other types of data structures may be used in place of packets, cells, frames, and so forth.

2.2. Network Paths

Any node in the depicted network 100 may communicate with any other node in the network 100 by sending data units through a series of nodes 110 and links, referred to as a path. For example, Node B (110b) may send data units to Node H (110h) via a path from Node B to Node D to Node E to Node H. There may be a large number of valid paths between two nodes. For example, another path from Node B to Node H is from Node B to Node D to Node G to Node H.

In an embodiment, a node 110 does not actually need to specify a full path for a data unit that it sends. Rather, the node 110 may simply be configured to calculate the best path for the data unit out of the device (e.g. which egress port it should send the data unit out on). When a node 110 receives a data unit that is not addressed directly to the node 110, based on header information associated with a data unit, such as path and/or destination information, the node 110 relays the data unit along to either the destination node 110, or a "next hop" node 110 that the node 110 calculates is in a better position to relay the data unit to the destination node 110. In this manner, the actual path of a data unit is product of each node 110 along the path making routing decisions about how best to move the data unit along to the destination node 110 identified by the data unit.

2.3. Network Device

Figure 2:
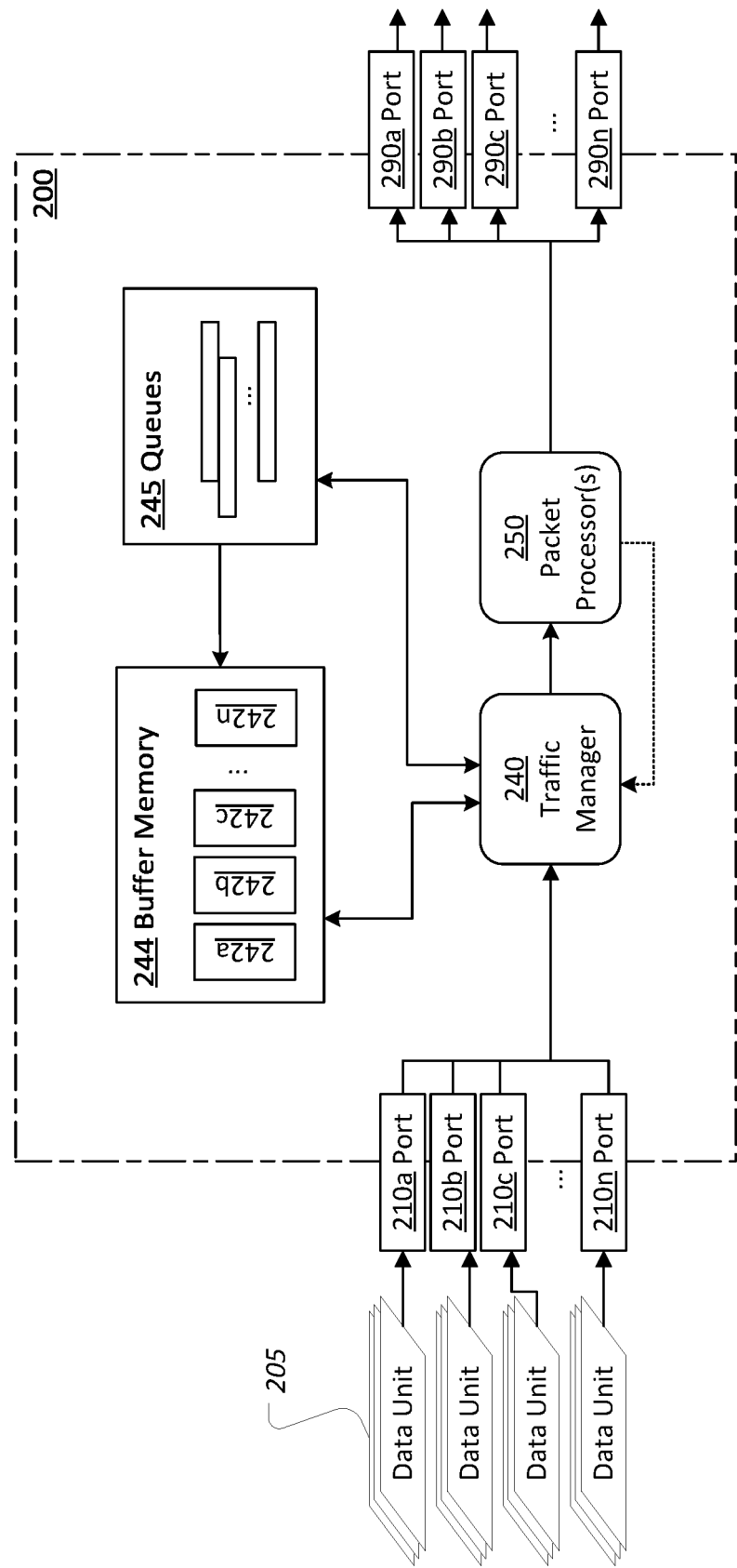
FIG. 2 is an illustrative view of various aspects of an example network device in which techniques described herein may be practiced.

FIG. 2 is an illustrative view of various aspects of an example network device 200 in which techniques described herein may be practiced, according to an embodiment. Network device 200 is a computing device comprising any combination of hardware and software configured to implement the various logical components described herein, including components 210-290. For example, the apparatus may be a single networking computing device, such as a router or switch, in which some or all of the components 210-290 described herein are implemented using application-specific integrated circuits (ASICs) or field programmable gate arrays (FPGAs). As another example, an implementing apparatus may include one or more memories storing instructions for implementing various components described herein, one or more hardware processors configured to execute the instructions stored in the one or more memories, and various data repositories in the one or more memories for storing data structures utilized and manipulated by various components 210-290.

Device 200 is generally configured to receive and forward data units 205 to other devices in a network, such as network 100, by means of a series of operations performed at various components within the device 200. Note that, in an embodiment, some or all of the nodes 110 in system such as network 100 may each be or include a separate network device 200. In an embodiment, a node 110 may include more than one device 200. In an embodiment, device 200 may itself be one of a number of components within a node 110. For instance, network device 200 may be an integrated circuit, or "chip," dedicated to performing switching and/or routing functions within a network switch or router. The network switch or router may further comprise one or more central processor units, storage units, memories, physical interfaces, LED displays, or other components external to the chip, some or all of which may communicate with the chip.

A non-limiting example flow of a data unit 205 through various subcomponents of the forwarding logic of device 200 is as follows. After being received via a port 210, a data unit 205 may be buffered by an arbiter until the data unit 205 can be processed by an ingress packet processor 250, and then delivered to an interconnect. From the interconnect, the data unit 205 may be forwarded to a traffic manager 240. The traffic manager 240 may store the data unit 205 in a buffer 244 and assign the data unit 205 to a queue 245. The traffic manager 240 manages the flow of the data unit 205 through the queue 245 until the data unit 205 is released to an egress packet processor 250. Depending on the processing, the traffic manager 240 may then assign the data unit 205 to another queue so that it may be processed by yet another egress processor 250, or the egress packet processor 250 may send the data unit 205 to an egress arbiter from which the data unit 205 finally forwarded out another port 290. Of course, depending on the embodiment, the forwarding logic may omit some of these subcomponents and/or include other subcomponents in varying arrangements.

Example components of a device 200 are now described in further detail.

2.4. Ports

Network device 200 includes ports 210/290. Ports 210, including ports 210a-n, are inbound ("ingress") ports by which data units referred to herein as data units 205 are received over a network, such as network 110. Ports 290, including ports 290a-n, are outbound ("egress") ports by which at least some of the data units 205 are sent out to other destinations within the network, after having been processed by the network device 200.

Data units 205 may be of any suitable PDU type, such as packets, cells, frames, etc. In an embodiment, data units 205 are packets. However, the individual atomic data units upon which the depicted components may operate may be actually be subunits of the data units 205, such as the previously depicted TDU 320. For example, data units 205 may be received, acted upon, and transmitted at a cell or frame level. These cells or frames may be logically linked together as the data units 205 (e.g. packets) to which they respectively belong for purposes of determining how to handle the cells or frames. However, the subunits may not actually be assembled into data units 205 within device 200, particularly if the subunits are being forwarded to another destination through device 200.

Ports 210/290 are depicted as separate ports for illustrative purposes, but may actually correspond to the same physical hardware ports (e.g. network jacks or interfaces) on the network device 210. That is, a network device 200 may both receive data units 205 and send data units 205 over a single physical port, and the single physical port may thus function as both an ingress port 210 and egress port 290. Nonetheless, for various functional purposes, certain logic of the network device 200 may view a single physical port as a separate ingress port 210 and egress port 290. Moreover, for various functional purposes, certain logic of the network device 200 may subdivide a single physical ingress port or egress port into multiple ingress ports 210 or egress ports 290, or aggregate multiple physical ingress ports or egress ports into a single ingress port 210 or egress port 290. Hence, in various embodiments, ports 210 and 290 should be understood as distinct logical constructs that are mapped to physical ports rather than simply as distinct physical constructs.

In some embodiments, the ports 210/290 of a device 200 may be coupled to one or more transceivers, such as Serializer/Deserializer ("SerDes") blocks. For instance, ports 210 may provide parallel inputs of received data units into a SerDes block, which then outputs the data units serially into an ingress packet processor 250. On the other end, an egress packet processor 250 may input data units serially into another SerDes block, which outputs the data units in parallel to ports 290.

2.5. Packet Processors

A device 200 comprises one or more packet processing components 250 that collectively implement forwarding logic by which the device 200 is configured to determine how to handle each data unit 205 that the device 200 receives. These packet processors 250 may be any suitable combination of fixed circuitry and/or software-based logic, such as specific logic components implemented by one or more Field Programmable Gate Arrays (FPGAs) or Application-Specific Integrated Circuits (ASICs), or a general-purpose processor executing software instructions.

Different packet processors 250 may be configured to perform different packet processing tasks. These tasks may include, for example, identifying paths along which to forward data units 205, forwarding data units 205 to egress ports 290, implementing flow control and/or other policies, manipulating packets, performing statistical or debugging operations, and so forth. A device 200 may comprise any number of packet processors 250 configured to perform any number of processing tasks.

In an embodiment, the packet processors 250 within a device 200 may be arranged such that the output of one packet processor 250 may, eventually, be inputted into another packet processor 250, in such a manner as to pass data units 205 from certain packet processor(s) 250 to other packet processor(s) 250 in a sequence of stages, until finally disposing of the data units 205 (e.g. by sending the data units 205 out an egress port 290, "dropping" the data units 205, etc.). The exact set and/or sequence of packet processors 250 that process a given data unit 205 may vary, in some embodiments, depending on the attributes of the data unit 205 and/or the state of the device 200. There is no limit to the number of packet processors 250 that may be chained together in such a manner.

Based on decisions made while processing a data unit 205, a packet processor 250 may, in some embodiments, and/or for certain processing tasks, manipulate a data unit 205 directly. For instance, the packet processor 250 may add, delete, or modify information in a data unit header or payload. In other embodiments, and/or for other processing tasks, a packet processor 250 may generate control information that accompanies the data unit 205, or is merged with the data unit 205, as the data unit 205 continues through the device 200. This control information may then be utilized by other components of the device 200 to implement decisions made by the packet processor 250.

In an embodiment, a packet processor 250 need not necessarily process an entire data unit 205, but may rather only receive and process a subunit of a data unit 205, such as a TDU comprising header information for the data unit. For instance, if the data unit 205 is a packet comprising multiple cells, the first cell, or a first subset of cells, might be forwarded to a packet processor 250, while the remaining cells of the packet (and potentially the first cell(s) as well) are forwarded in parallel to a merger component where they await results of the processing.

Ingress and Egress Processors

In an embodiment, a packet processor may be generally classified as an ingress packet processor 250 or an egress packet processor 250. Generally, an ingress processor 250 resolves destinations for a traffic manager 240 to determine which ports 290 and/or queues 245 a data unit 205 should depart from. There may be any number of ingress processors 250, including just a single ingress processor 250.

In an embodiment, an ingress processor 250 performs certain intake tasks on data units 205 as they arrive. These intake tasks may include, for instance, and without limitation, parsing data units 205, performing routing related lookup operations, categorically blocking data units 205 with certain attributes and/or when the device 200 is in a certain state, duplicating certain types of data units 205, making initial categorizations of data units 205, and so forth. Once the appropriate intake task(s) have been performed, the data units 205 are forwarded to an appropriate traffic manager 240, to which the ingress processor 250 may be coupled directly or via various other components, such as an interconnect component.

The egress packet processor(s) 250 of a device 200, by contrast, may be configured to perform non-intake tasks necessary to implement the forwarding logic of the device 200. These tasks may include, for example, tasks such as identifying paths along which to forward the data units 205, implementing flow control and/or other policies, manipulating data units, performing statistical or debugging operations, and so forth. In an embodiment, there may be different egress packet processors(s) 250 assigned to different flows or other categories of traffic, such that not all data units 205 will be processed by the same egress packet processor 250.

In an embodiment, each egress processor 250 is coupled to a different group of egress ports 290 to which they may send data units 205 processed by the egress processor 250. In an embodiment, access to a group of ports 290 may be regulated via an egress arbiter coupled to the egress packet processor 250. In some embodiments, an egress processor 250 may also or instead be coupled to other potential destinations, such as an internal central processing unit, a storage subsystem, or a traffic manager 240.

2.6. Buffers

Since not all data units 205 received by the device 200 can be processed by the packet processor(s) 250 at the same time, various components of device 200 may temporarily store data units 205 in memory structures referred to as buffers 244 while the data units 205 are waiting to be processed. For example, a certain packet processor 250 may only be capable of processing a certain number of data units 205, or portions of data units 205, in a given clock cycle, meaning that other data units 205, or portions of data units 205, destined for the packet processor 250 must either be ignored (i.e. dropped) or stored. At any given time, a large number of data units 205 may be stored in the buffers 244 of the device 200, depending on network traffic conditions.

A device 200 may include a variety of buffers 244, each utilized for varying purposes and/or components. Generally, a data unit 205 awaiting processing by a component is held in a buffer 244 associated with that component until the data unit 205 is "released" to the component for processing.

Buffers 244 may be implemented using any number of distinct banks 242a-n of memory. Each bank 242 may be a portion of any type of memory, including volatile memory and/or non-volatile memory. In an embodiment, each bank 242 comprises many addressable "slots" or "entries" (e.g. rows, columns, etc.) in which data units 205, subunits, linking data, or other types of data, may be stored. The size of each entry in a given bank 242 is known as the "width" of the bank 242, while the number of entries in the bank 242 is known as the "depth" of the bank 242. The number of banks 242 may vary depending on the embodiment.

Each bank 242 may have associated access limitations. For instance, a bank 242 may be implemented using single-ported memories that may only be accessed once in a given time slot (e.g. clock cycle). Hence, the device 200 may be configured to ensure that no more than one entry need be read from or written to the bank 242 in a given time slot. A bank 242 may instead be implemented in a multi-ported memory to support two or more accesses in a given time slot. However, single-ported memories may be desirable in many cases for higher operating frequencies and/or reducing costs.

In an embodiment, in addition to physical banks 242, a device may be configured to aggregate certain banks 242 together into logical banks 242 that support additional reads or writes in a time slot and/or higher write bandwidth. In an embodiment, each bank 242, whether logical or physical, is capable of being accessed concurrently with each other bank 242 in a same clock cycle, though full realization of this capability is not necessary.

Some or all of the components in device 200 that utilize one or more buffers 244 may include a buffer manager configured to manage use of those buffer(s) 244. Among other processing tasks, the buffer manager may, for example, maintain a mapping of data units 205 to buffer entries in which data for those data units 205 is stored, determine when a data unit 205 must be dropped because it cannot be stored in a buffer 244, perform garbage collection on buffer entries for data units 205 (or portions thereof) that are no longer needed, and so forth.

A buffer manager may include buffer assignment logic. The buffer assignment logic is configured to identify which buffer entry or entries should be utilized to store a given data unit 205, or portion thereof. In some embodiments, each data unit 205 is stored in a single entry. In yet other embodiments, a data unit 205 is received as, or divided into, constituent data unit portions for storage purposes. The buffers may store these constituent portions separately (e.g. not at the same address location, or even within the same logical or physical bank 242). The one or more buffer entries in which a data unit 205 are stored are marked as utilized (e.g. in a "free" list) to prevent newly received data units 205 from overwriting data units 205 that are already buffered. After a data unit 205 is released from the buffer, the one or more entries in which the data unit 205 is buffered may then be marked as available for storing new data units 205.

In some embodiments, the buffer assignment logic is relatively simple, in that data units 205 or data unit portions are assigned to banks 242 and/or specific entries within those banks 242 randomly or using a round-robin approach. In some embodiments, data units 205 are assigned to buffers at least partially based on characteristics of those data units 205, such as corresponding traffic flows, destination addresses, source addresses, ingress ports, and/or other metadata. For example, different banks 242 may be utilized to store data units 205 received from different ports 210 or sets of ports 210. In an embodiment, the buffer assignment logic also or instead utilizes buffer state information, such as utilization metrics, to determine which bank 242 and/or buffer entry to assign to a data unit 205, or portion thereof. Other assignment considerations may include buffer assignment rules (e.g. no writing two consecutive TDUs from the same PDU to the same bank) and I/O scheduling conflicts (e.g. to avoid assigning a data unit to a bank when there are no available write operations to that bank on account of other components reading content already in the bank).

Examples of improved buffer storage mechanisms are described in subsequent sections.

2.7. Queues

In an embodiment, to manage the order in which data units 205 are processed from the buffers, various components of a device 200 may implement queuing logic. For example, the flow of data units through ingress buffers may be managed using ingress queues while the flow of data units through egress buffers may be managed using egress queues.

Each data unit 205, or the buffer locations(s) in which the data unit 205 is stored, is said to belong to one or more constructs referred to as queues 245. Typically, a queue 245 is a set of memory locations (i.e. in the buffers) arranged in some order by metadata describing the queue 245. The memory locations may (and often are) non-contiguous relative to their addressing scheme and/or physical arrangement. For example, the metadata for one queue 245 may indicate that the queue 245 is comprised of, in order, entry addresses 2, 50, 3, and 82 in a certain buffer.

In many embodiments, the sequence in which the queue 245 arranges its constituent data units 205 generally corresponds to the order in which the data units 205 or data unit portions in the queue 245 will be released and processed. Such queues 245 are known as first-in-first-out ("FIFO") queues, though in other embodiments other types of queues may be utilized. In some embodiments, the number of data units 205 or data unit portions assigned to a given queue 245 at a given time may be limited, either globally or on a per-queue basis, and this limit may change over time.

2.8. Traffic Management

According to an embodiment, a device 200 further includes one or more traffic managers 240 configured to control the flow of data units to one or more packet processor(s) 250. For instance, a buffer manager within the traffic manager 240 may temporarily store data units 205 in buffers 244 as they await processing by egress processor(s) 250. A traffic manager 240 may receive data units 205 directly from a port 210, from an ingress processor 250, and/or other suitable components of device 200. In an embodiment, the traffic manager 240 receives one TDU from each possible source (e.g. each port 210) each clock cycle or other time slot.

Traffic manager 240 may include or be coupled to egress buffers 244 for buffering data units 205 prior to sending those data units 205 to their respective egress processor(s) 250. A buffer manager within the traffic manager 240 may temporarily store data units 205 in egress buffers 244 as they await processing by egress processor(s) 250. The number of egress buffers 244 may vary depending on the embodiment. A data unit 205 or data unit portion in an egress buffer 244 may eventually be "released" to one or more egress processor(s) 250 for processing, by reading the data unit 205 from the buffer 244 and sending the data unit 205 to the egress processor(s) 250. In an embodiment, traffic manager 240 may release up to a certain number of data units 205 from buffers 244 to egress processors 250 each clock cycle or other defined time slot.

Beyond managing the use of buffers 244 to store data units 205 (or copies thereof), a traffic manager 240 may include queue management logic configured to assign buffer entries to queues 245 and manage the flow of data units 205 through the queues 245. The traffic manager 240 may, for instance, identify a specific queue 245 to assign a data unit 205 to upon receipt of the data unit 205. The traffic manager 240 may further determine when to release—also referred to as "dequeuing"—data units 205 (or portions thereof) from queues 245 and provide those data units 205 to specific packet processor(s) 250. Buffer management logic in the traffic manager 240 may further "deallocate" entries in buffer 244 that store data units 205 are no longer linked to the traffic manager's queues 245. These entries are then reclaimed for use in storing new data through a garbage collection process.

In an embodiment, different queues 245 may exist for different destinations. For example, each port 210 and/or port 290 may have its own set of queues 245. The queue 245 to which an incoming data unit 205 is assigned and linked may, for instance, be selected based on forwarding information indicating which port 290 the data unit 205 should depart from. In an embodiment, a different egress processor 250 may be associated with each different set of one or more queues 245. In an embodiment, the current processing context of the data unit 205 may be used to select which queue 245 a data unit 205 should be assigned to.

In an embodiment, there may also or instead be different queues 245 for different flows or sets of flows. That is, each identifiable traffic flow or group of traffic flows is assigned its own set of queues 245 to which its data units 205 are respectively assigned. In an embodiment, different queues 245 may correspond to different classes of traffic or quality-of-service (QoS) levels. Different queues 245 may also or instead exist for any other suitable distinguishing properties of the data units 205, such as source address, destination address, packet type, and so forth.

Though only one packet processor 250 and traffic manager 240 are depicted, a device 200 may comprise any number of packet processors 250 and traffic managers 240. For instance, different sets of ports 210 and/or ports 290 may have their own traffic manager 240 and packet processors 250. As another example, in an embodiment, the traffic manager 240 may be duplicated for some or all of the stages of processing a data unit. For example, system 200 may include a traffic manager 240 and egress packet processor 250 for an egress stage performed upon the data unit 205 exiting the system 200, and/or a traffic manager 240 and packet processor 250 for any number of intermediate stages. The data unit 205 may thus pass through any number of traffic managers 240 and/or packet processors 250 prior to exiting the system 200. In other embodiments, only a single traffic manager 240 is needed. If intermediate processing is needed, flow of a data unit 205 may "loop back" to the traffic manager 240 for buffering and/or queuing after each stage of intermediate processing.

In an embodiment, a traffic manager 240 is coupled to the ingress packet processor(s) 250, such that data units 205 (or portions thereof) are assigned to buffers 244 only upon being initially processed by an ingress packet processor 250. Once in an egress buffer 244, a data unit 205 (or portion thereof) may be "released" to one or more egress packet processor(s) 250 for processing, either by the traffic manager 240 sending a link or other suitable addressing information for the corresponding buffer 244 to the egress packet processor 250, or by sending the data unit 205 directly.

In the course of processing a data unit 205, a device 200 may replicate a data unit 205 one or more times for purposes such as, without limitation, multicasting, mirroring, debugging, and so forth. For example, a single data unit 205 may be replicated to multiple egress queues 245. For instance, a data unit 205 may be linked to separate queues 245 for each of ports 1, 3, and 5. As another example, a data unit 205 may be replicated a number of times after it reaches the head of a queue 245 (e.g. for different egress processors 250). Hence, though certain techniques described herein may refer to the original data unit 205 that was received by the device 200, it will be understood that those techniques will equally apply to copies of the data unit 205 that have been generated for various purposes. A copy of a data unit 205 may be partial or complete. Moreover, there may be an actual physical copy of the data unit 205 in buffers 244, or a single copy of the data unit 205 may be linked from a single buffer location to multiple queues 245 at the same time.

2.9. Forwarding Logic

The logic by which a device 200 determines how to handle a data unit 205—such as where and whether to send a data unit 205, whether to perform additional processing on a data unit 205, etc.—is referred to as the forwarding logic of the device 200. This forwarding logic is collectively implemented by a variety of the components of the device 200, such as described above. For example, an ingress packet processor 250 may be responsible for resolving the destination of a data unit 205 and determining the set of actions/edits to perform on the data unit 205, and an egress packet processor 250 may perform the edits. Or, the egress packet processor 250 may also determine actions and resolve a destination in some cases. Also, there may be embodiments when the ingress packet processor 250 performs edits as well.

The forwarding logic may be hard-coded and/or configurable, depending on the embodiment. For example, the forwarding logic of a device 200, or portions thereof, may, in some instances, be at least partially hard-coded into one or more ingress processors 250 and/or egress processors 250. As another example, the forwarding logic, or elements thereof, may also be configurable, in that the logic changes over time in response to analyses of state information collected from, or instructions received from, the various components of the device 200 and/or other nodes in the network in which the device 200 is located.

In an embodiment, a device 200 will typically store in its memories one or more forwarding tables (or equivalent structures) that map certain data unit attributes or characteristics to actions to be taken with respect to data units 205 having those attributes or characteristics, such as sending a data unit 205 to a selected path, or processing the data unit 205 using a specified internal component. For instance, such attributes or characteristics may include a Quality-of-Service level specified by the data unit 205 or associated with another characteristic of the data unit 205, a flow control group, an ingress port 210 through which the data unit 205 was received, a tag or label in a packet's header, a source address, a destination address, a packet type, or any other suitable distinguishing property. A traffic manager 240 may, for example, implement logic that reads such a table, determines one or more ports 290 to send a data unit 205 to based on the table, and sends the data unit 205 to an egress processor 250 that is coupled to the one or more ports 290.

According to an embodiment, the forwarding tables describe groups of one or more addresses, such as subnets of IPv4 or IPv6 addresses. Each address is an address of a network device on a network, though a network device may have more than one address. Each group is associated with a potentially different set of one or more actions to execute with respect to data units that resolve to (e.g. are directed to) an address within the group. Any suitable set of one or more actions may be associated with a group of addresses, including without limitation, forwarding a message to a specified "next hop," duplicating the message, changing the destination of the message, dropping the message, performing debugging or statistical operations, applying a quality of service policy or flow control policy, and so forth.

For illustrative purposes, these tables are described as "forwarding tables," though it will be recognized that the extent of the action(s) described by the tables may be much greater than simply where to forward the message. For example, in an embodiment, a table may be a basic forwarding table that simply specifies a next hop for each group. In other embodiments, a table may describe one or more complex policies for each group. Moreover, there may be different types of tables for different purposes. For instance, one table may be a basic forwarding table that is compared to the destination address of each packet, while another table may specify policies to apply to packets upon ingress based on their destination (or source) group, and so forth.

In an embodiment, forwarding logic may read port state data for ports 210/290. Port state data may include, for instance, flow control state information describing various traffic flows and associated traffic flow control rules or policies, link status information indicating links that are up or down, port utilization information indicating how ports are being utilized (e.g. utilization percentages, utilization states, etc.). Forwarding logic may be configured to implement the associated rules or policies associated with the flow(s) to which a given packet belongs.

As data units 205 are routed through different nodes in a network, the nodes may, on occasion, discard, fail to send, or fail to receive certain data units 205, thus resulting in the data units 205 failing to reach their intended destination. The act of discarding of a data unit 205, or failing to deliver a data unit 205, is typically referred to as "dropping" the data unit. Instances of dropping a data unit 205, referred to herein as "drops" or "packet loss," may occur for a variety of reasons, such as resource limitations, errors, or deliberate policies. Different components of a device 200 may make the decision to drop a data unit 205 for various reasons. For instance, a traffic manager 240 may determine to drop a data unit 205 because, among other reasons, buffers 244 are overutilized, a queue 245 is over a certain size, and/or a data unit 205 has a certain characteristic.

2.10. Efficient Buffering Mechanisms

Figure 4:
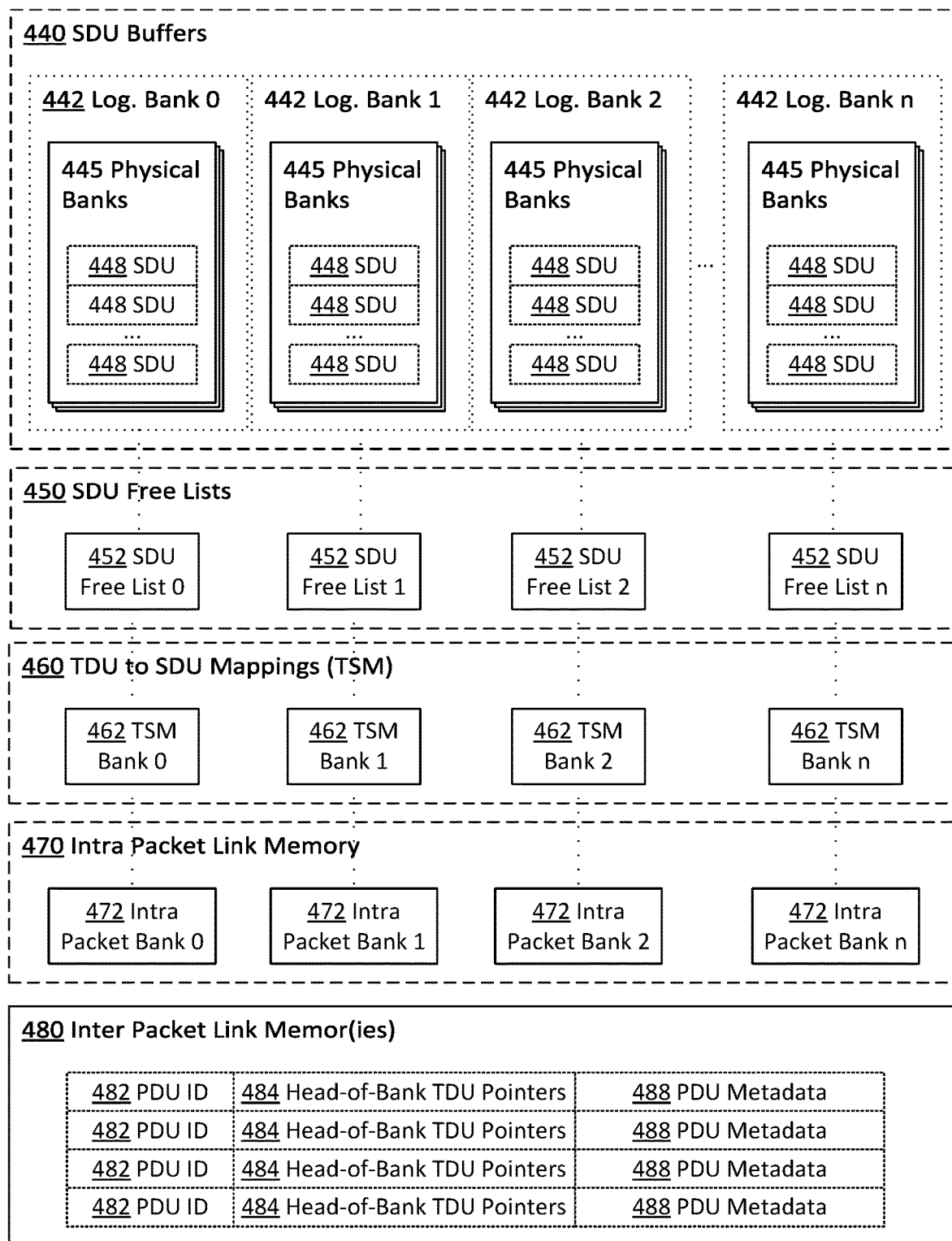
FIG. 4 illustrates an example buffer system configured to efficiently buffer Transport Data Units ("TDUs") by dividing the TDUs into Storage Data Units ("SDUs") buffered across multiple physical banks.

FIG. 4 illustrates an example buffer system 400 configured to efficiently buffer TDUs by dividing the TDUs into SDUs buffered across multiple physical banks, according to an embodiment. Buffer system 400 buffers TDUs, such as the previously described TDUs 320, that have been divided into individual SDUs, such as the previously described SDUs 330, for storage in SDU buffers 440. Each SDU is stored in a separate entry 448 within a physical bank 445 of the SDU buffers 440.

Each physical bank 445 may be a separate and distinct memory structure, such as a single-ported memory or double-ported memory, having a width equal to the maximum possible size of an SDU. In an embodiment, each physical bank 445 has a same depth, though in other embodiments some physical banks 445 may have different depths. Physical banks 445 are logically grouped together, for addressing and other purposes, into logical banks 442.

There may be any number of logical banks 442, and any number of physical banks 445 within the logical banks 442. In an embodiment, the number of logical banks 442 is at least as large as the number of data units that the buffering component can receive each clock cycle, plus at least one additional logical bank 442 to support read operations. Moreover, there may be more than one logical bank 442 to support read operations, as well as additional logical banks (s) 442 to support other needs.

Each SDU may be no greater in size than the maximum size of an SDU entry 448 within the physical banks 445 (i.e. the "width" of the physical banks 445). In an embodiment, all TDUs are of a fixed TDU size except for the last TDU in a PDU, while all SDUs are of a fixed SDU size except for the last SDU in a TDU. For convenience, the TDUs and SDUs in such an embodiment will be referred to as being of a "fixed size," though it will be understood that the last TDU and the last SDU may be less than this fixed size.

Figure 5:
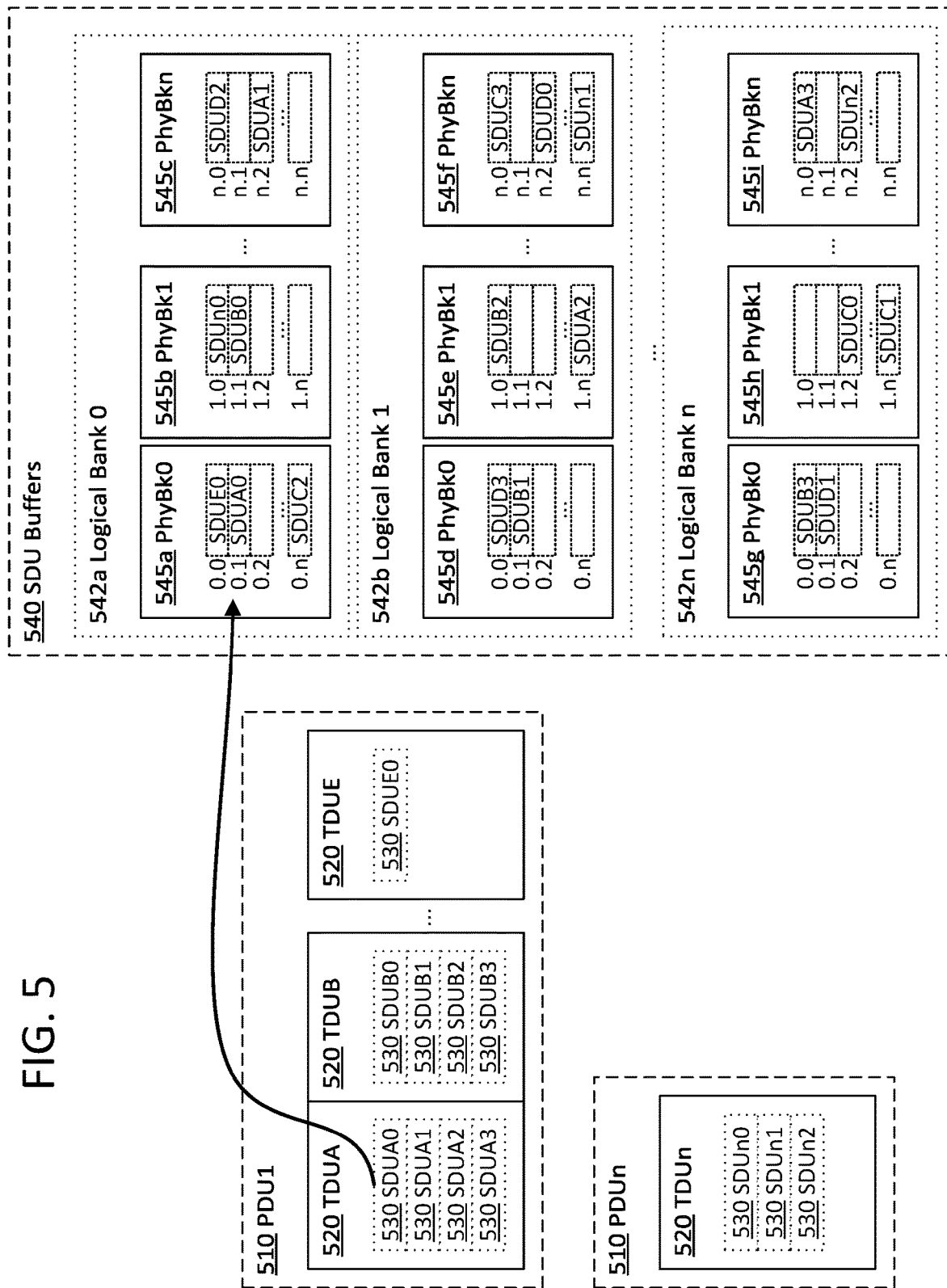
FIG. 5 illustrates an example arrangement of SDUs within an SDU buffer.

FIG. 5 illustrates an example arrangement of SDUs 530 within an SDU buffer 540, according to an embodiment. SDU buffer 540 may be an instance of SDU buffers 440, comprising logical banks 542a-n. The depicted logical banks 542a-n each include at least three physical banks, depicted collectively as physical banks 545a-n. Entries within these physical banks 545 are addressed in the depiction according to the following scheme: physical bank number, followed by a dot, followed by entry address number. Although only four entries are depicted in each physical bank 545, it will be appreciated that each bank 545 may in fact have many additional entries. Likewise, each logical bank 542 may have many additional physical banks 545, and/or SDU buffers 540 may have many additional logical banks 542.

Two PDUs 510, labeled PDU1 and PDUn, are depicted as being buffered in SDU buffers 540, though of course many additional PDUs 510 may be buffered in non-depicted entries. Each PDU 510 comprises one or more TDUs 520, which are divided into SDUs 530. As depicted, the first SDU in the first TDU of PDU1, labeled SDUA0, has been placed at address 0.1 in physical bank 0 (545a) of logical bank 0 (542a). For convenience, this address may be referred to as 0-0.1, where the number in front of the dash refers to the logical bank number, the number after the dash refers to the physical bank number, and the final number refers to the address within that physical bank. Of course, the depicted address scheme is merely illustrative, and a wide variety of alternative address schemes may be employed.

Other SDUs 530 have been placed at various other addresses within the SDU buffers. For instance, the next SDU in PDU1, labeled SDUA1, is stored at address 0-n.2. As another example, the first and only SDU in TDUE of PDU1, labeled SDUE0, is stored at address 0-0.0, while the last SDU of PDUn, labeled SDUn, is stored at address n-n.2. Note that PDU1 includes additional TDUs and SDUs beyond those depicted in PDU1 itself, including SDUC0-SDUC3 and SDUD0-SDUD3. These additional SDUs are also stored at various addresses in SDU buffers 540.

Returning now to FIG. 4, various supporting memory structures may also exist within the buffer system 400. For instance, there may be one or more free lists 452 for each logical bank 442 that indicate which entries within those banks 442 are currently available (i.e. "empty" or "free") to store new SDUs. Moreover, to assist in reconstructing TDUs and PDUs from the buffered SDUs, various linking metadata may be maintained, as described presently.

TDU-TO-SDU Mappings

Figure 6:
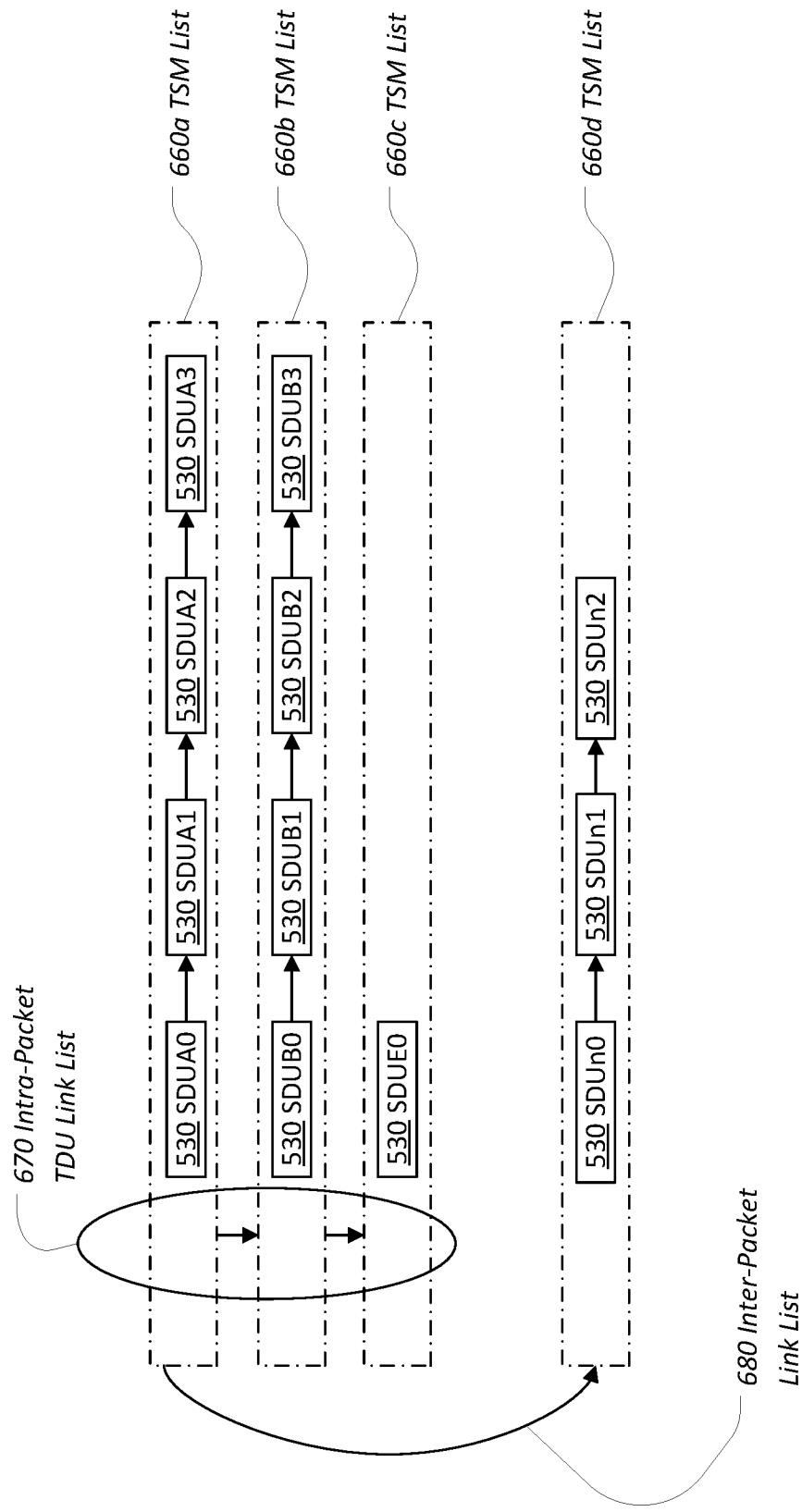
FIG. 6 illustrates various linking structures that may be utilized in support of SDU buffers.

For each TDU, there may be a TDU-to-SDU Mapping ("TSM") list that indicates which of the buffered SDUs belong to the TDU. For example, FIG. 6 illustrates various linking structures that may be utilized in support of SDU buffers, according to an embodiment. The SDUs 530 from FIG. 5 are organized into linked lists, referred to as TSM lists 660a-d, each corresponding to a different TDU 520. Of course, it will be recognized that the SDU data itself is not linked together, but rather addresses or other references to the stored SDU data. In any event, by maintaining these linked lists, a buffer system such as buffer system 400 may easily reconstruct TDUs 520 from the individually buffered SDUs 530.

Buffer system 400 thus includes one or more TDU-to-SDU mapping memories 460 (for convenience, referred to simply as the TSM memory 460) to store these TSM lists. Although the TSM memory 460 may take any suitable form, in an embodiment, there is a separate physical memory bank 462—also referred to as a TSM bank 462—for each logical bank 442 of the SDU buffers 440.

Each entry in the TSM mapping memory 460—also referred to as a TSM entry—may store a TSM list—that is, a list of SDUs that belong to a corresponding TDU. Each entry may be of sufficient size to identify, by reference, each SDU in the corresponding TDU. For instance, a TSM entry may store an address of each SDU entry 448 that stores an SDU that belongs to the TDU. Each TSM entry may therefore, in an embodiment, be of a size sufficiently large to store addresses for the maximum number of SDUs that can belong to the TDU.

In an embodiment, there may be a separate TSM entry in the TSM memory 460 for each SDU entry 448. For instance, for each address in the SDU memory 440, there may be a separate TSM entry that has the same address, or at least a corresponding address, in that its address is mappable to the SDU memory address via a one-to-one mapping function. Hence, the number of entries in the TSM memory 460 is the same as the number of SDU entries 448 in the SDU buffers 440. In embodiments where each of the TSM banks 462 corresponds to a different logical bank 442, each entry of a TSM bank 462 has a corresponding entry 448 in the corresponding logical bank 442.

Buffer system 400 may leverage a one-to-one correspondence between TSM entries and SDU entries 448 to reduce the sizes of the stored TSM lists. That is, since a TSM list is stored in the TSM memory 460 at an address that corresponds directly to an SDU entry 448, it follows that a TSM list may be stored at a TSM entry address that corresponds to the address of the SDU entry 448 in which the first SDU of the TDU is stored. Hence, the address of the SDU entry 448 that stores the first SDU in a TDU would be implicit from the address of the TSM entry at which the TSM list for the TDU is stored. The address of the SDU entry 448 that stores the first SDU thus need not be repeated in the TSM list.

Figure 7:
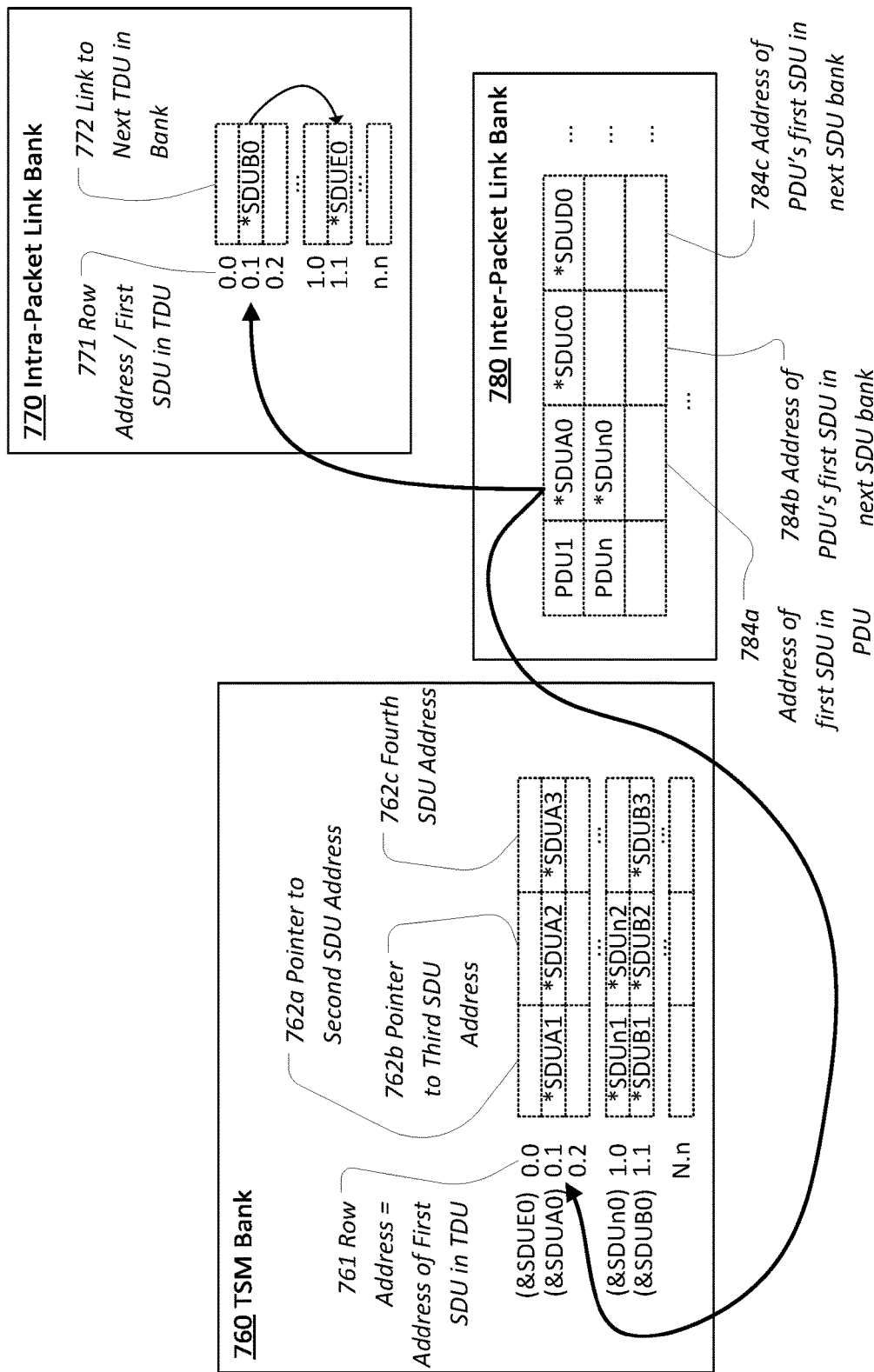
FIG. 7 illustrates one example arrangement of supporting link memories for an example SDU buffer, according to an embodiment with one-to-one correspondence between TSM entries and SDU entries.

FIG. 7 illustrates one example arrangement of supporting link memories for the example SDU buffer 540 depicted in FIG. 5, according to an embodiment with one-to-one correspondence between TSM entries and SDU entries. Among these supporting link memories is a TSM Bank 760, which stores TSM lists specifically for TDUs assigned to Logical Bank 0 (by virtue of their first SDU having been stored therein). TSM Bank 760 includes multiple entries, each of which may store a TSM list for a different TDU. Each entry has an address 761 that corresponds to the address of the SDU entry in SDU buffers 540 that stores the first SDU in the TDU whose TSM list is stored therein. For instance, the TSM entry at address 0.1 contains the TSM list for TDUA, since SDUA0 is the first SDU in TDUA, and since SDUA0 is stored at address 0.1 of Logical Bank 0 in SDU Buffers 540. For similar reasons, the TSM list for TDUB is found at address 1.1, and the TSM list for TDUn is found at address 1.0. Each TSM entry in TSM Bank 760 includes pointers 762 to additional SDUs in the corresponding TDU.

One consequence of a one-to-one correspondence between TSM entries and SDU entries 448 is that the depth of the TSM memory 460, as a whole, must be the same as the depth of the SDU buffers 440, as a whole. Depending on how many SDUs may be in a TDU, this may mean that a large number of TSM entries are, at any given time, not used. Moreover, because the address of the TDU in the TSM memory 460 may correspond to the address of the TDU in another linking memory, such as the subsequently described intra-packet memory, there may similarly be many unused entries other memories as well.

In some embodiments, it may therefore be beneficial to cut down on the number of TSM entries by utilizing TDU indirection. In such embodiments, the addressing scheme of the TSM memory 460 need not correspond to that of the SDU buffers 460. Rather, each TDU has its own address in the TSM memory 460 independent of the addresses of any SDUs that belong to the TDU. Each SDU in the TDU must therefore be explicitly identified in the TSM list, which means the width of the TSM entries may be greater than in the afore-mentioned embodiments. On the other hand, the depth of the TSM memory 460 may be reduced significantly.

Figure 9:
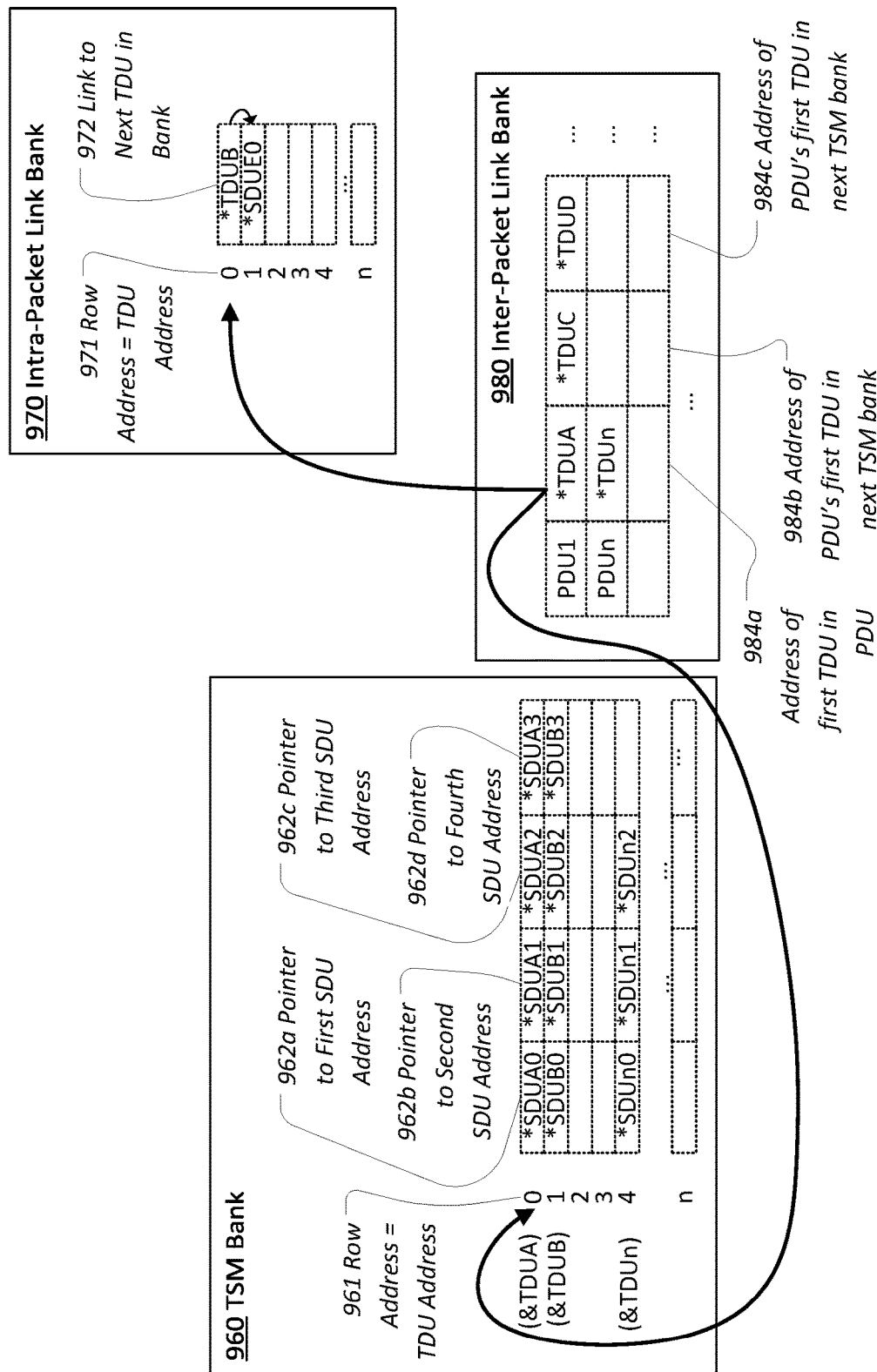
FIG. 9 illustrates another example arrangement of supporting link memories for the example SDU buffer, according to an embodiment with TDU indirection.

FIG. 9 illustrates another example arrangement of supporting link memories for the example SDU buffer 540 depicted in FIG. 5, according to an embodiment with TDU indirection. Among these supporting link memories is a TSM Bank 960, which may store TSM lists for any TDUs, regardless of where the first SDU of the TDU is stored. TSM Bank 760 includes multiple entries, each of which may store a TSM list for a different TDU. Each entry has an address 961. For instance, the TSM entry at address 0 contains the TSM list for TDUA. Meanwhile, the TSM list for TDUB is found at address 1, and the TSM list for TDUn is found at address 4. Each TSM entry in TSM Bank 960 includes pointers 962 to each of the SDUs in the corresponding TDU. Note that the pointers 962 include a pointer 962a to the first SDU, which was not necessary in TSM Bank 760.

In embodiments with TDU indirection, buffer system 400 may further comprise a TDU free list, also known as a TSM free list, that among other aspects indicates with TSM entries in the TSM memory 460 are currently free to store new TSM lists. In embodiments with one-to-one correspondence between TSM entries and SDU entries 448, on the other hand, no separate free list is needed for the TSM memory 460, since the fact that an SDU entry is indicated as free in the SDU free lists 450 will implicitly indicate that the TSM entry at the corresponding address is also free.

In embodiments with multiple TSM banks, a TDU may be assigned to a specific TSM bank, so that its TSM list may be stored therein. The assignment may, in some embodiments, be based upon where the first SDU of the TDU was stored. For example, in one embodiment with TSM indirection, comprising a TSM bank 462 for each logical SDU bank 442, a TDU's TSM list is stored in the TSM bank 462 that corresponds to the logical SDU bank 442 in which the first SDU of the TDU is stored. In other embodiments, a TSM list may be stored in any suitable TSM bank 462.

Intra-Packet Link Memory

Buffer system 400 further includes one or more intra-packet linking memories 470, which are for convenience referred to herein simply as intra-packet memory 470. Intra-packet memory 470 links the TDUs in a PDU together in one or more linked lists, referred to herein as intra-packet link lists, typically by chaining together references to addresses assigned to the TDUs (e.g. the TSM entry addresses assigned to the TDUs for storing the TSM lists 660).

For example, referring again to FIG. 6, it was previously noted that each TSM list 660 corresponded to a TDU. Intra-packet link lists 670, also referred to simply as intra-packet lists 670, may in effect link these TSM lists 660 together. Hence, one may view the process of reconstructing a PDU to involve iteratively using the intra-packet link list 670 to locate the next TSM list 660 to process, and then using that TSM list 660 to locate the next SDUs 530 to process.

Returning to FIG. 4, the intra-packet linking memory 470 may take any suitable form. In an embodiment, there may be separate physical memory banks 472 of the intra-packet linking memories, referred to as intra-packet banks 472, each corresponding to a different logical bank 442 (and, depending on the embodiment, a TSM bank 462).

The intra-packet linking memory 470 may represent intra-packet link lists using any suitable representation. For example, in an embodiment, each TDU is assigned an intra-packet entry in the intra-packet memory 470. The intra-packet entry for a TDU may contain a pointer to the intra-packet entry for a next TDU in the PDU, with the last intra-packet entry in the link list being empty. An intra-packet link list is thus, in essence, a chain of intra-packet entries linked in this manner.

Moreover, each intra-packet entry implicitly or explicitly indicates the address of the TSM entry in which the TSM list for the corresponding TDU is stored. For example, in some embodiments, for each TSM entry, there is an intra-packet link entry that has a corresponding address. The intra-packet link entry at the corresponding address corresponds to the same TDU as the TSM list in the TSM entry, and thus knowledge of the address of the intra-packet entry for a TDU also allows one to locate the TSM list for the TDU.

In an embodiment, rather than forming a single intra-packet link list for the entire PDU, there may be a separate intra-packet link list for each logical bank 442. Hence, the intra-packet entry for the first TDU of a PDU in a logical bank 442 would point to the intra-packet entry for the second TDU of the PDU in the logical bank 442, regardless of whether that second TDU immediately followed the first TDU in the PDU. Such linked lists may, among other aspects, assist in quickly queueing reads in each logical bank 442, and additional metadata (e.g. in an inter-packet link memory) might be used to resolve the order of TDUs between the different logical banks 442.

In some embodiments, as with the TSM entries of the TSM memory 460, the entries in each intra-packet bank 472 may likewise have a one-to-one correspondence with the SDU entries 448. Each intra-packet entry whose address corresponds to the address of an SDU entry that stores the first SDU in a TDU is considered to be the intra-packet entry for that TDU. Thus, for instance, the intra-packet entry whose address corresponds to the address of the SDU entry that stores the first SDU in the first TDU of the PDU would point to the address of the SDU entry that stores the first SDU in the second TDU of the PDU, and so forth.

FIG. 7 depicts an Intra-Packet Link Bank 770 arranged in such a manner. Each entry of Intra-Packet Link Bank 770 may store linking information for a single TDU. Each entry has an address 771, which corresponds to the address of the SDU entry in SDU Buffer 540 that stores the first SDU of the TDU, and a link 772, by reference, to another TDU. An intra-packet link list for PDU1 begins with the intra-packet entry 0.1 of Intra-Packet Link Bank 770, which corresponds directly to the SDU entry at address 0.1 of Logical Bank 0 in FIG. 5. The corresponding SDU entry stores SDUA0, which is the first SDU of the first TDU, TDUA, in PDU1. Meanwhile, the first SDU of TDUB, which immediately follows TDUA, is SDUB0, which is stored at address 1.1 of Logical Bank 0. Hence, the intra-packet entry at address 0.1, corresponding to TDUA, points to address 1.1, corresponding to TDUB.

Note that the intra-packet entry at 1.1 for TDUB points to the address of the first SDU of another TDU in PDU1, TDUE, by means of pointing to the address for the first SDU in TDUE, SDUE0. This is because the intra-packet link bank 770 in FIG. 7 is specific to Logical Bank 0 of FIG. 5. That is, as illustrated in FIG. 5, the third TDU of PDU1 found in Logical Bank 0 jumps from TDUB0 to TDUE0, even though PDU1 contains a number of TDUs in between TDUB0 and TDUE0. Thus, as illustrated in FIG. 7, the intra-packet entry for SDUB0/TDUB is linked directly to SDUE0/TDUE instead of to the immediately following TDU (TDUC).

In embodiments with TDU indirection, the addressing of the intra-packet link entries still corresponds to the addressing of the TSM entries, but does not correspond to the addressing of the SDU entries. The intra-packet link memory 470 otherwise operates analogously to previously described embodiments.

Optionally, in some embodiments with TDU indirection, when a TDU has only one SDU (e.g. if the TDU is the last TDU in a PDU, or the last TDU for the PDU within a specific bank), the intra-packet entry for the second-to-last TDU may point directly to the address of the SDU entry in which the SDU is stored, instead of to an address of another intra-packet entry or TSM entry. If needed, metadata for the PDU (e.g. in an inter-packet link memory) may indicate that the address is to an SDU entry instead of a TSM entry. Conceptually, since the TSM list for the TDU would contain only a single SDU, this may be viewed as storing the TSM list for the TDU directly in the intra-packet link bank 970, thereby avoiding reading of the TSM bank 960. A separate TDU address for an intra-packet entry and TSM entry thus need not be allocated for the TDU, reducing the number of intra-packet entries and TSM entries utilized.

FIG. 9 depicts an Intra-Packet Link Bank 970 arranged in such a manner. Each entry of Intra-Packet Link Bank 970 may store linking information for a single TDU. Each entry has an address 971, which corresponds to the address of the TSM entry in TSM Bank 960 that stores the TSM list for the TDU, and a link 972, by reference, to another TDU. An intra-packet link list for PDU1 begins with the intra-packet entry 0 of Intra-Packet Link Bank 970, which corresponds to the TSM entry at address 0 of TSM Bank 960. Meanwhile, the TSM list of TDUB, which immediately follows TDUA, is SDUB0, is stored at address 1 of TSM Bank 960. Hence, the intra-packet entry at address 0, corresponding to TDUA, points to address 1, corresponding to TDUB.

Moreover, the TDU of PDU1 that immediately follows TDUB in Logical Bank 0 is TDUE, whose first SDU is SDUE0. The intra-packet entry for TDUB, at address 1 of intra-packet bank 970, points directly to the address of the SDU buffer entry that stores SDUE0. This is because TDUE has only a single SDU. Thus, there is no need for a separate TSM entry to store a TSM list for TDUE, since it may be stored entirely within a single intra-packet entry.

Inter-Packet Link Memor(ies)

Buffer system 400 further includes one or more inter-packet linking memories 480, which are for convenience referred to herein simply as inter-packet memory 480. Inter-packet memory 480 may, among other aspects, assist in linking PDUs together for queueing and other purposes, by forming one or more linked lists, referred to herein as inter-packet link lists. For example, referring again to FIG. 6, an inter-packet link list 680, also referred to simply as inter-packet list 680 may link PDU1 to PDUn.

However, the inter-packet link memory 480 may serve a variety of additional functions, primarily in storing metadata for the PDU. Returning to FIG. 4, the inter-packet linking memory 470 may take any suitable form. Though only a single inter-packet memory bank is depicted, there may be any number of such banks, and there need not be a correspondence in number with respect to the other link memories.

Each entry of the inter-packet link memory 480, also referred to as an inter-packet entry, may store metadata for a different PDU. For example, each entry may store or implicitly indicate a PDU identifier 482 of some kind. Each entry may further include a variety of PDU metadata 488, including without limitation inter-packet metadata described elsewhere herein.

Each entry may further include one or more head pointers 484. Each head pointer 484 points to an intra-packet list for the PDU. For instance, each head pointer 484 may point to an address of an intra-packet entry at which such a list begins. The first head pointer 484 may point to the address of the intra-packet entry (including an intra-packet bank identifier) that corresponds to the first TDU of the PDU, and the linked list beginning there at may subsequently be followed to locate linking data for other TDUs for the PDU.

In embodiments where intra-packet lists exist for each logical bank 442, there may be a separate head pointer 484 for each logical bank 442 in which data for the PDU is stored. Each head pointer 484 points to the start of the intra-packet list for its corresponding bank. Additional metadata in PDU Metadata 488, or in the intra-packet entries themselves, may assist in resolving TDU ordering between the different banks.

For example, FIG. 7 depicts an example inter-packet link bank 780, comprising separate entries for PDU1 and PDUn. Only head pointers 784 are depicted in these entries, with other metadata omitted for clarity. The first head pointer 784*a* for PDU1 points to the address at which SDUA0 is stored, by which may be located both the start of the intra-packet list for TDUA at address 0.1 of the intra-packet link bank 770 and the TSM list for TDUA in address 0.1 of the TSM Bank 760. Subsequent head pointers 784 for PDU1 point to the head entries of intra-packet lists in other, non-depicted intra-packet banks.

Similarly, FIG. 9 depicts an example inter-packet link bank 980, comprising separate entries for PDU1 and PDUn. The first head pointer 984*a* for PDU1 points to the address of the intra-packet entry for TDUA, at which begins the intra-packet list PDU1 for Logical Bank 0. Subsequent head pointers 784 for PDU1 point to the head entries of intra-packet lists in other, non-depicted intra-packet banks.

In an embodiment, in the event that an intra-packet list would comprise only a single TDU having only a single SDU (e.g. as may sometimes occur if the only TDU assigned to a bank is the last TDU in its PDU), the head pointer for that intra-packet list may point directly to the SDU. That is, both the TSM list for the TDU and the intra-packet list for the bank may be collapsed into a single reference to the SDU, thus avoiding the need to allocate any TSM entry or intra-packet entry for the intra-packet list.

In an embodiment, the inter-packet memory 480 may optionally be coupled to a snapshot memory that operates as an overflow are for packet metadata 488 and/or head pointers 484, should these grow sufficiently large. The snapshot memory may be similarly addressed, or the inter-packet entry may include a link to each snapshot entry used.

Extended Examples

Figure 8:
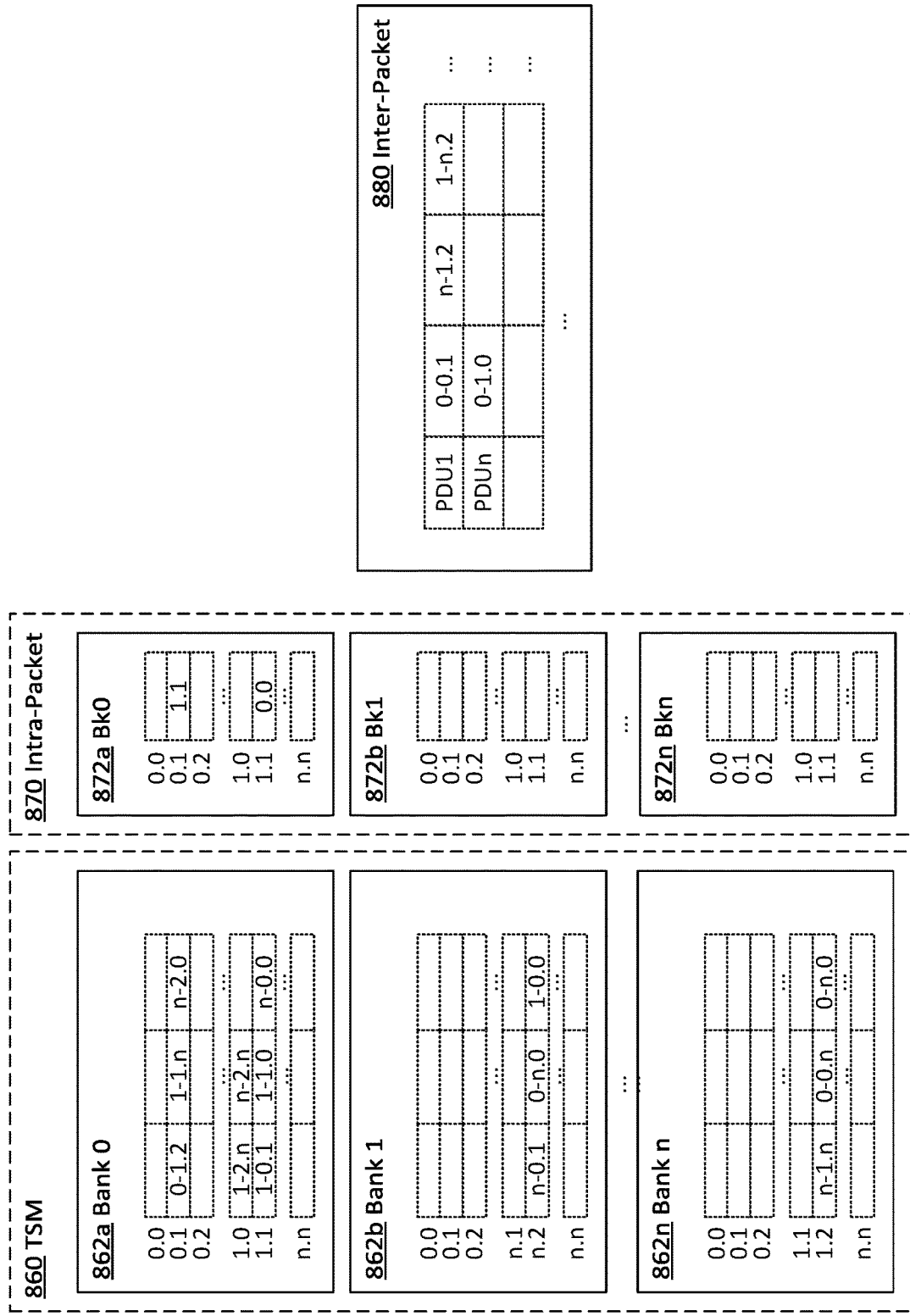
FIG. 8 illustrates examples of a multi-banked TSM, intra-packet memory, and inter-packet memory in which linking data for SDU buffers may be stored using a one-to-one correspondence between SDU buffer entries and TSM entries.

FIG. 8 illustrates examples of a multi-banked TSM 860, intra-packet memory 870, and inter-packet memory 880 in which linking data for SDU buffers 540 may be stored using a one-to-one correspondence between SDU buffer entries and TSM entries, according to an embodiment. TSM bank 862*a* is, in essence, the same as TSM bank 760, except that actual addresses are now depicted for illustrative purposes. Likewise, intra-packet bank 872*a* is the same as intra-packet bank 770, and inter-packet bank 880 is the same as inter-packet bank 780, but with actual addresses depicted.

Additionally, other TSM banks 862*b* and 862*n* are depicted, storing TSM lists for TDUs that have been assigned to Logical Banks 1 and n of SDU buffers 540, respectively. Similarly, other intra-packet banks 872*b* and 872*n* are depicted, which are configured for storing intra-packet lists of TDUs that have been assigned to Logical Banks 1 and n of SDU buffers 540, respectively. However, since neither of these lists have more than a single TDU, no additional data need be stored in intra-packet banks 872*b* and 872*n*.

FIG. 10 illustrates examples of a multi-banked TSM 1060, intra-packet memory 1070, and inter-packet memory 1080 in which linking data for SDU buffers 540 may be stored using TDU indirection, according to an embodiment. TSM bank 1062*a* is, in essence, the same as TSM bank 960, except that actual addresses are now depicted for illustrative purposes. Likewise, intra-packet bank 1072*a* is the same as intra-packet bank 970, and inter-packet bank 1080 is the same as inter-packet bank 980, but with actual addresses depicted.

Additionally, other TSM banks 1062*b* and 1062*n* are depicted, storing TSM lists for TDUs that have been assigned to Logical Banks 1 and n of SDU buffers 540, respectively. Similarly, other intra-packet banks 1072*b* and 1072*n* are depicted, which are configured for storing intra-packet lists of TDUs that have been assigned to Logical Banks 1 and n of SDU buffers 540, respectively. However, since neither of these lists have more than a single TDU, no additional data need be stored in intra-packet banks 872*b* and 872*n*.

2.11. Miscellaneous

Device 200 illustrates only one of many possible arrangements of devices configured to provide the functionality described herein. Other arrangements may include fewer, additional, or different components, and the division of work between the components may vary depending on the arrangement. Moreover, in an embodiment, the techniques described herein may be utilized in a variety of computing contexts other than within a network 100.

Furthermore, FIGS. 4-10 illustrate but a few of the various arrangements of memories that may be utilized to implement the described buffering techniques. Other arrangements may include fewer or additional elements in varying arrangements. For instance, there may be additional or fewer logical banks, physical banks, TSM banks, and/or intra-packet banks. Moreover, there may be varying numbers of entries having different addressing schemes.

In an embodiment, a TSM memory and an intra-packet link memory may be combined. For instance, the last row of the TSM bank may include a pointer to the TSM entry that stores information for the next TDU within the PDU, or at least within the corresponding bank. In yet another embodiment, the TSM memory and/or the intra-packet link memory may be combined with the SDU buffer memory, such that an SDU entry may include one or both of a TSM mapping and intra-packet linking data.

For simplification, the traffic managers, packet processors, and other components are on occasion described herein as acting upon or with respect to a data unit, when in fact only a portion of the data unit may be sent to or otherwise available to the component. For instance, a packet processor may be said to process a data unit, when in fact only the data unit control portion is available to the packet processor. In such contexts, it will be understood that the information about the data unit that is actually available to the component is a representation of the data unit to that component. Any actions described herein as having been taken by the component on or with respect to the data unit may occur with respect to the representation of the data unit, and not necessarily the complete data unit.

3.0. FUNCTIONAL OVERVIEW

Described in this section are various example method flows for implementing various features of the systems and system components described herein. The example method flows are non-exhaustive. Alternative method flows and flows for implementing other features will be apparent from the disclosure.

The various elements of the process flows described below may be performed in a variety of systems, including in a device 200 that utilizes some or all of the buffering mechanisms described with respect to FIGS. 4-10. In an embodiment, each of the processes described in connection with the functional blocks described below may be implemented using one or more integrated circuits, logic components, computer programs, other software elements, and/or digital logic in any of a general-purpose computer or a special-purpose computer, while performing data retrieval, transformation, and storage operations that involve interacting with and transforming the physical state of memory of the computer.

3.1. Enqueue Process

Figure 11:
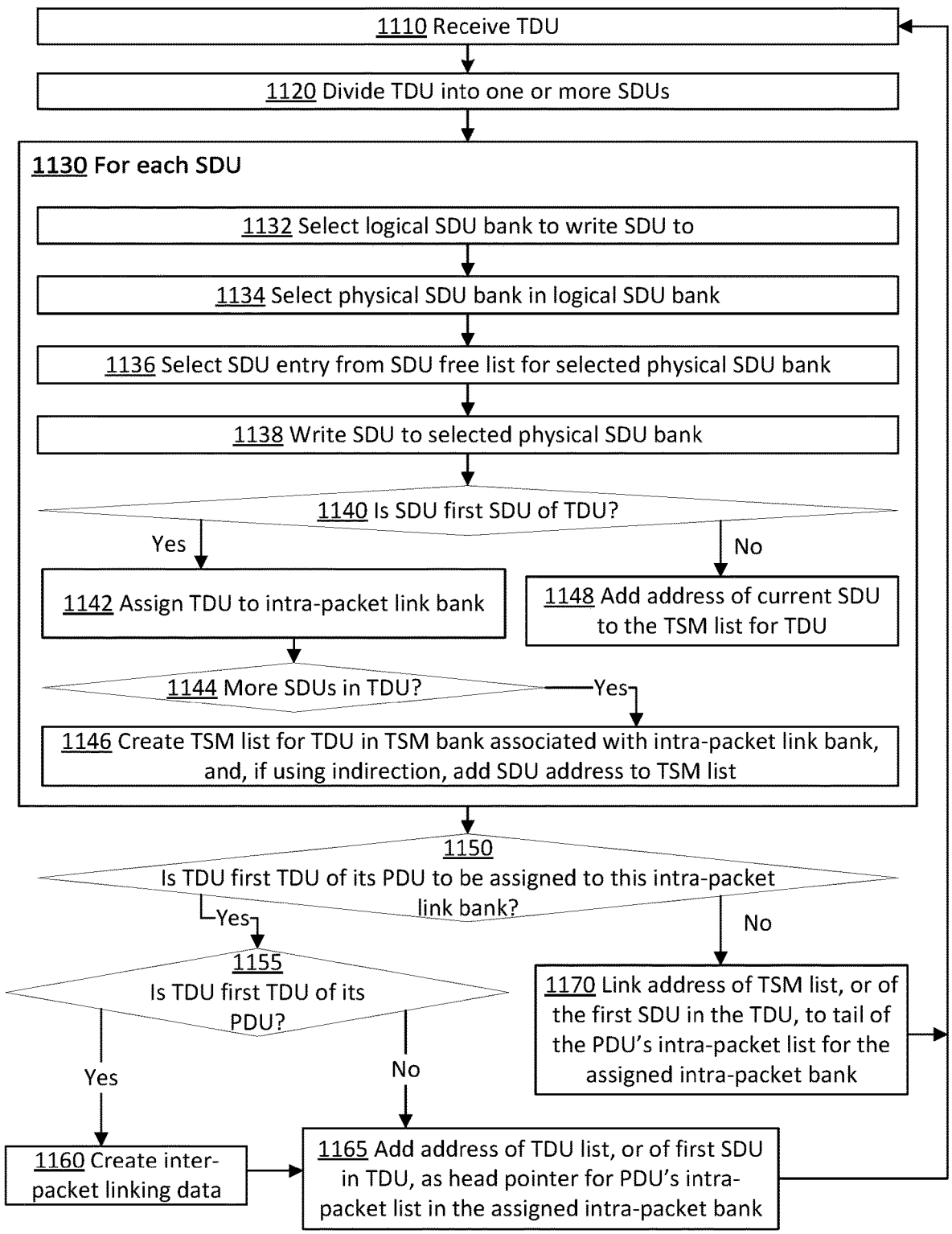
FIG. 11 illustrates an example process flow for enqueuing a TDU at a buffering component.

FIG. 11 illustrates an example process flow 1100 for enqueuing a TDU at a buffering component, according to an embodiment. Block 1110 comprises receiving a TDU, such as a TDU 320 or 520. The TDU may be received at a traffic manager such as traffic manager 240, or at any other device component that may need to temporarily buffer the TDU.

Block 1120 comprises dividing the TDU into one or more SDUs, such as SDUs 330 or 530. The number of SDUs into which the TDU is divided is a function of the TDU size divided by the width of the SDU buffer entries in which the SDUs will be buffered. For most TDUs, assuming a fixed TDU size, the number of SDUs created will be the same. However, the final TDU in a PDU may have fewer SDUs, depending on the size of the TDU.

Block 1130 involves buffering each of the SDUs. Block 1130 comprises a number of sub-blocks 1130-1146, which are repeated for each of the SDUs. Sub-block 1132 comprises selecting a logical SDU bank to write the SDU to. For instance, block 1132 may comprise selecting a specific logical bank 442 from among the set of all logical banks 442 in the SDU buffers 440. Any assignment mechanism may be utilized, though the assignment mechanism will preferably load-balance amongst logical banks. In an embodiment, the assignment mechanism may be configured not to select a logical bank 442 that is currently being read from, or to which another SDU has already been written in a current clock cycle. In another embodiment, a logical bank 422 may support multiple operations per clock cycle and the assignment mechanism may therefore be configured not to select a logical bank 442 when there are no more available I/O operations in the current clock cycle. In some embodiments the first SDU of each TDU must be assigned to a different logical bank 442, though in other embodiments no such restriction need be imposed.

Sub-block 1134 comprises selecting, within the selected logical bank, a physical SDU bank to write the SDU to. For instance, sub-block 1134 may comprise selecting a specific physical bank 445 from among the set of all physical banks 445 in the selected logical bank. Again, any suitable assignment mechanism may be utilized. Again, a load-balancing assignment mechanism may be desirable in certain embodiments. Moreover, as with the selection of the logical banks, the assignment mechanism may take into consideration I/O access limitations as well as any other I/O operations that may already be pending for the physical banks.

Sub-block 1136 comprises selecting an SDU entry in which to store the SDU in the selected physical bank using an SDU free list. An SDU free list indicates available SDU entries in which newly received data may be buffered. The SDU free list may take any suitable form, such as a list, table, mapping, and so forth. An available SDU entry is selected from the SDU free list to store the SDU using any suitable selection logic. For instance, the first SDU entry in the SDU free list may always be selected, or an SDU entry may be selected from the SDU free list at random. The selected SDU entry is then removed from the SDU free list or otherwise designated as no longer being available.

In an embodiment, one or more SDU free lists may have further been utilized in selecting the logical bank and/or physical bank in sub-blocks 1132 and 1134. For instance, a logical or physical bank may have its own SDU free list. The number of entries in the SDU free list for a bank may be a factor in the selection of which bank to store the SDU in, such that banks with large numbers of SDU entries available are selected more frequently than banks with low numbers of SDU entries available. As another example, there may be a single SDU free list for all physical banks or all logical banks. Instead of explicitly selecting a logical bank and/or physical bank up front, the selected logical bank and/or physical bank may be implicitly selected by virtue of containing the SDU entry that is selected from the SDU free list.

Sub-block 1138 comprises writing the SDU to the selected SDU entry.

Sub-block 1140 comprises determining whether the SDU is the first SDU of the TDU to which the SDU belongs. If so, block 1130 proceeds to sub-block 1142. Sub-block 1142 comprises assigning the TDU to an intra-packet link bank. For instance, the TDU may be assigned to a specific one of the intra-packet banks 472. If TDU indirection is not utilized, the assigned intra-packet link bank should be associated with the logical SDU bank selected in block 1132. Otherwise, any intra-packet link bank may be assigned. The assignment may involve, for instance, selecting a bank at least partially pseudo-randomly and/or based on various factors such as bank fill levels and TDU free lists. Any necessary intra-packet linking data for the TDU will, by virtue of this assignment, be written in the assigned intra-packet link bank, as described in subsequent blocks. Since the assigned buffer is not actually written to until subsequent blocks, the assignment may in some embodiments be postponed until after all of the SDUs are buffered.

Sub-block 1144 comprises determining whether there are additional SDUs in the TDU. If so, then in block 1146, a TSM list may be created for the TDU in the TSM bank that is associated with the intra-packet link bank assigned in block 1142. For instance, a TSM list may be initialized in the TSM bank that corresponds to the logical SDU bank that was selected in block 1132.

The TSM list may be saved at different TSM entry addresses within the TSM bank, depending on whether or not TDU indirection is employed. For instance, if TDU indirection is not employed, the TSM list may be stored in the TSM entry whose address corresponds to that of the SDU entry in which the SDU was just stored. Because of the correspondence between the SDU entry address and the TDU entry address, the location of the first SDU in the TDU is readily discernable from the address of the TDU entry, and therefore need not be added to the TSM list. Hence, in such embodiments, sub-block 1146 is a trivial step that may in fact be delayed until the next iteration of block 1130, since no data is actually written to the TSM entry until the next SDU is processed.

On the other hand, in embodiments with TDU indirection, sub-block 1146 may comprise actually writing the address of the SDU entry to the TSM list. The TSM list itself may be stored in any available TSM entry. In an embodiment, there is a TDU free list that indicates addresses of entries that are available for storing new TSM lists. An address may be selected from this TDU free list, and then removed from the TDU free list.

Returning to sub-block 1140, if the SDU is not the first SDU of the TDU to which the SDU belongs, then block 1130 proceeds to sub-block 1148. In sub-block 1148, the address of the SDU entry to which the SDU was written is added to the TSM list for the TDU, which is stored in the TSM entry identified per sub-block 1146 (e.g. during the first iteration of block 1130 for the TDU).

Once all of the SDUs have been buffered in block 1130, flow 1100 proceeds to block 1150. Block 1150 comprises determining whether the TDU is the first TDU of its PDU to be assigned to its intra-packet link bank. If so, then in block 1155 it is determined whether the TDU is the first TDU of the PDU. If so, then in block 1160, inter-packet linking data is created for the PDU. This inter-packet linking data may be created directly in an entry of an inter-packet memory, such as an inter-packet memory 480. Or, the inter-packet linking data may be created in a temporary construct known as a "receive context." Once the PDU has been fully buffered and queued, the receive context may then be copied to an inter-packet link entry.

If this TDU is not the first TDU of its PDU, or after the inter-packet linking data has been created, then flow 1100 proceeds to block 1165. Block 1165 comprises adding the address of the TSM list for the TDU as a head pointer for the PDU's intra-packet link list in the assigned intra-packet bank. Depending on the embodiment, this may be an SDU buffer entry address and/or a TSM entry address, as described in other sections. In an embodiment, if the PDU has only one TDU assigned to the intra-packet bank, and if that TDU contains only a single SDU, the head pointer may point directly to the address of his SDU.

If in block 1150 it is determined that the TDU is not the first TDU of the PDU to be assigned to this intra-packet link bank, then flow 1100 proceeds to block 1170. Block 1170 comprises adding the address of the TSM list for the TDU—which may or may not also be the address of the first SDU in the TDU, depending on the embodiment, to the tail of the PDU's intra-packet list for the assigned intra-packet bank. For instance, if the linking structure of intra-packet bank 770 is used, this may comprise writing the address of the TSM list to the intra-packet entry whose address corresponds to the immediately preceding TDU, of the PDU, that was assigned to the intra-packet bank. In an embodiment, if the TDU contains only a single SDU, the intra-packet entry may instead point directly to the address of this SDU.

Though not depicted, in an embodiment, if this TDU is the last TDU in the PDU, the PDU may be linked to one or more queues (e.g. by reference to the address of the inter-packet entry in which its inter-packet linking data has been stored).

Flow 1100 illustrates but one example flow for enqueueing a TDU in a system that employs the buffering techniques described herein. Other flows may include additional or fewer elements, in varying arrangements. For instance, among other variations, the updating of certain linking data need not necessarily wait until after block 1130 has been performed, but may rather begin as SDUs are still being processed in block 1130.

Note that multiple instances of flow 1100 may be performed substantially concurrently. For instance, there may be any number of interfaces via which the buffering component may receive a TDU in a given clock cycle or other defined period of time. Indeed, the buffering component may have been given access to multiple banks of buffer memory, in part, to facilitate the ability to perform multiple instances of flow 1100 concurrently.

3.2. Dequeue Process

Figure 12:
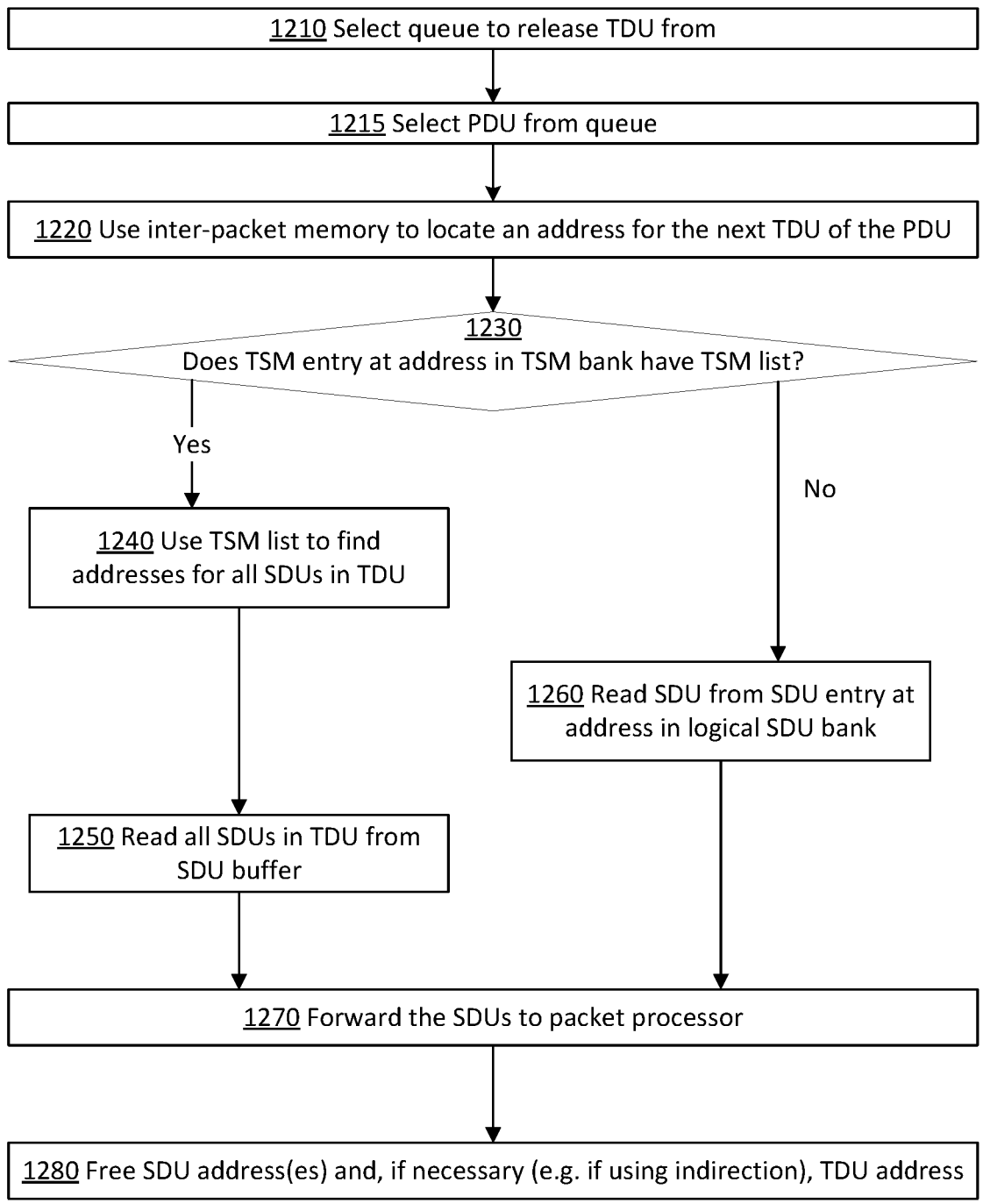
FIG. 12 illustrates an example process flow for dequeuing a buffered TDU.

FIG. 12 illustrates an example process flow 1200 for dequeuing a buffered TDU, according to an embodiment. Among other aspects, flow 1200 may be utilized for sending a TDU that has been buffered per flow 1100, from the component that is buffering the TDU to another component. For instance, flow 1200 may be performed by a traffic manager 240 or other component of device 200 that releases a certain number of TDUs in a given time slot to one or more downstream packet processors, such as to an egress processor 250.

Block 1210 comprises selecting a queue to release a TDU from. The selection of a queue may be in accordance with any of a variety of queue selection techniques, and flow 1200 need not be limited to any specific selection mechanism.

Block 1215 comprises selecting, from the queue, the PDU whose TDU will be released. For instance, in the event of a FIFO queue, the selected PDU may be the PDU at the head of the selected queue. Of course, other techniques may be utilized to select a PDU that is not necessarily at the head of the queue.

Flow 1200 may be performed one TDU at a time. In some embodiments, the PDU and/or queue selected in an immediately preceding iteration of flow 1200 may be different than the PDU and/or queue selected in the current iteration of flow 1200, even if not all of the TDUs in the previously selected PDU have been released. For instance, over a given period of time, TDUs from multiple PDUs and/or queues may be released substantially concurrently, with the traffic manager rotating between different PDUs and/or queues.

Moreover, multiple instances of flow 1200 may be performed at the same time. For instance, there may be different groups of ports, each coupled to an independent scheduler responsible for releasing one TDU from the group each clock cycle or other defined period of time.

In some embodiments, block 1210 may be omitted or skipped in certain instances. For instance, in an embodiment, if a PDU is already in the process of being dequeued, scheduling logic may in certain cases be configured to select the PDU in block 1215 without first having selected a queue to release the PDU from. The selection of a queue is thus implicit from selecting the PDU.

Block 1220 comprises using inter-packet linking data to locate an address for the next TDU of the PDU. This may involve, for instance, reading a head pointer from an inter-packet memory such as inter-packet memory 480. In some embodiments, locating the address may further comprise following an intra-packet link list beginning at an intra-packet entry to which the head pointer points to find the address of the next unread TDU in the list. In other embodiments, following an intra-packet link list is not necessary for block 1220, as the dequeuing logic may be configured to move the head pointer to the next unread TDU in the intra-packet link list automatically upon the first TDU in the intra-packet link list being read.

In embodiments with bank-specific head pointers, various logic may be utilized to determine which bank's head pointer is to be read. In some embodiments, for instance, inter-packet linking data may indicate the position of each head pointer within the PDU, such that the head pointer with the lowest position is selected. In some embodiments, the order in which TDUs are read from the buffer is not important, and position data may be utilized at some point after the TDUs are read to properly order the TDUs. Hence, the bank whose head pointer is taken may be selected based on other factors, such as which head pointer is listed first, or which bank(s) are currently available to be read.

Block 1230 comprises determining whether the TSM entry at the located address in the TSM bank has a TSM list. In most cases corresponds, the located address will correspond to a TSM entry in which a TDU list is found, such as a TDU entry in TSM memory 460. Hence, flow 1200 will proceed to block 1240, which shall be described subsequently. However, in some cases, the located address may simply be the address of an SDU entry, without an accompanying TSM list in the TSM memory. Such may be the case if the TDU has only a single SDU. In these cases, flow 1200 proceeds to block 1260, which comprises reading the SDU from an SDU entry in a logical SDU bank that corresponds to the located address.

Note that, in embodiments with TDU indirection, if the address located in block 1220 is that of an SDU entry, the located address will not correspond to any TSM entry. Hence, in some embodiments, it may be necessary to determine whether the located address corresponds to a TSM entry or to an SDU entry. If not apparent from the address itself, various metadata in the inter-packet memory, such as a PDU size, SDU count, and/or a TDU count may be utilized along with a running count of SDUs, TDUs, and/or bytes read to determine how to interpret the located address. For instance, if the amount of data remaining in the PDU is less than the size of one SDU, the located address may be assumed to be that of an SDU entry instead of a TSM entry.

Returning to block 1240, block 1240 comprises using the TSM list at the TSM entry corresponding to the address for the TDU to locate addresses for each of the SDUs in the TDU. In embodiments with TDU indirection, this may comprise reading all of the SDU addresses from the TSM entry. In embodiments where the TSM entry address also corresponds to the address of the first SDU in the TDU, only the addresses of the remaining SDUs in the TDU are read from the TSM entry.

From block 1240, flow 1200 proceeds to block 1250. Block 1250 comprises reading all of the SDUs in the TDU from the SDU addresses in a SDU buffer, such as SDU buffer 440. Depending on the embodiment, the SDUs may be read immediately, or the addresses may be added to a buffer read queue along with other SDU addresses that need to be read (e.g. from other TDUs and/or PDUs), which may be optimized so as to maximize the amount of data that is read from each logical bank in a given time slot. Also, depending on the embodiment and on the banks in which the SDUs are stored, the SDUs may or may not be read concurrently.

From blocks 1250 and 1260, flow 1200 proceeds to block 1270. Block 1270 comprises forwarding the SDUs to a next component, such as a packet processor associated with the selected queue. Optionally, in some embodiments, the SDUs may be reassembled into a TDU before proceeding to the packet processor. Depending on how the SDUs are read, reassembly into the TDU may involve, for example, temporarily caching SDUs of the TDU until all of the SDUs have been read from the SDU buffers.

Block 1280 comprises freeing the SDU addresses and, if using TDU indirection, the address of the TDU as well. Generally, this involves adding the SDU addresses to an SDU free list and adding the TDU address to a TDU free list. This signifies that the SDU entries, TSM entry, and intra-packet entry that correspond to the freed addresses are now available to store data for other SDUs and TDUs. Optionally, the freeing of these addresses may involve certain garbage collection processes, which may entail adding the addresses to a garbage collection list for processing prior to being freed.

In some embodiments, flow 1200 may return back to block 1220 to release additional TDUs from the PDU. In other embodiments, flow 1200 returns back to block 1210 to select a potentially different queue and/or PDU to release a TDU from.

Flow 1200 illustrates but one example flow for dequeuing a TDU in a system that employs the buffering techniques described herein. Other flows may include additional or fewer elements, in varying arrangements. For instance, in the event that the read TDU is the last TDU in the PDU, flow 1200 may further comprise removing the PDU from the selected queue.

4.0. EXAMPLE EMBODIMENTS

Examples of some embodiments are represented, without limitation, in the following clauses:

According to an embodiment, a network apparatus comprises: network interfaces configured to receive and send data over one or more networks; packet processors configured to process data units prior to sending the data units out the network interfaces; a traffic manager configured to receive Transport Data Units ("TDUs") destined for particular network interfaces and forward the TDUs to particular packet processors associated with the particular network interfaces; a buffer memory system, coupled to the traffic manager, configured to buffer the TDUs received by the traffic manager until the traffic manager is ready to send the TDUs to the particular packet processors, the TDUs divided into Storage Data Units ("SDUs") prior buffering, the buffer memory system comprising: logical SDU banks configured to store the SDUs, each of the logical SDU banks comprising multiple physical SDU banks, each of the physical SDU banks comprising SDU entries, each of the SDU entries configured to store a single SDU; a TDU-to-SDU mapping ("TSM") memory storing TSM lists, each TSM list indicating, for a different TDU of the TDUs, addresses of SDU entries that store SDUs that belong to the TDU; buffer management logic configured to assign SDUs to SDU entries and to generate the TSM lists.

In an embodiment, each of the TDUs belongs to a protocol data unit ("PDU"), a given PDU having one or more TDUs, the buffer memory system further comprising: an intra-packet linking memory storing intra-packet link lists, each of the intra-packet link lists linking together a set of TDUs that belong to a same PDU; an inter-packet memory storing inter-packet linking data, the inter-packet linking data for a given PDU including one or more head pointers, each of the one or more head pointers pointing to a start of a different intra-packet link list for the PDU; wherein the buffer management logic is further configured to generate the intra-packet link lists and inter-packet linking data.

In an embodiment, each PDU is an Internet Protocol ("IP") packet and each TDU is a cell or a frame.

In an embodiment, each TDU except the last TDU in a PDU has a fixed TDU size, the last TDU being no greater in size than the fixed TDU size, wherein each SDU except the last SDU in a PDU has a fixed SDU size, the fixed SDU size corresponding to the size of each of the SDU entries, the last SDU being no greater in size than the fixed SDU size, wherein the PDUs do not have a fixed PDU size.

In an embodiment, the buffer management logic is further configured to, for at least each particular TDU of the TDUs that has more than one SDU: assign the particular TDU to a TSM entry in the TSM memory; store a particular TSM list for the particular TDU in the assigned TSM entry; assign the particular TDU to an intra-packet entry in the intra-packet memory; store, in the assigned intra-packet entry, a pointer to an address assigned to a next TDU in a particular intra-packet link list; wherein the assigned TSM entry and the assigned intra-packet entry have corresponding addresses.

In an embodiment, the buffer management logic is further configured to select the corresponding addresses of the assigned TSM entry and the assigned intra-packet entry so as to also correspond to an address of a first SDU entry that stores a first SDU of the particular TDU.

In an embodiment, each logical SDU bank has a corresponding TSM bank in the TSM memory and a corresponding intra-packet bank in the intra-packet linking memory, wherein each intra-packet link list for the PDU links TDUs whose assigned TSM entries are in the TSM bank that corresponds to the intra-packet bank in which the particular intra-packet link list is stored.

In an embodiment, the number of TSM banks and the number of intra-packet banks differ from the number of logical SDU banks.

In an embodiment, the buffer management logic is further configured to write an address of an SDU entry instead of an address of a TSM entry in the intra-packet memory or the inter-packet memory when a TDU comprises only a single SDU.

According to an embodiment, a method comprises: receiving a Transport Data Unit ("TDU") belonging to a Protocol Data Unit ("PDU"); dividing the TDU into Storage Data Units ("SDUs"); buffering the SDUs in SDU entries of an SDU buffer, the SDU buffer comprising logical SDU banks, each of the logical SDU banks comprising multiple physical SDU banks, each of the physical SDU banks comprising a plurality of SDU entries, each of the SDUs stored in a different SDU entry of the SDU entries; creating, in a TDU-to-SDU mapping ("TSM") memory, a TSM list for the TDU, the TSM list indicating addresses of the SDU entries; determining to release the TDU from the SDU buffer to a packet processor; locating the TSM list for the TDU; based on the TSM list, locating the SDU entries; reading the SDUs from the SDU entries; forwarding the SDUs to the packet processor.

In an embodiment, the PDU is an Internet Protocol ("IP") packet and the TDU is a cell or a frame.

In an embodiment, the method further comprises: assigning the TDU to an address of an intra-packet entry in an intra-packet linking memory, the address also corresponding to a TSM entry, in the TSM memory, at which the TSM list is stored; adding the assigned address to an intra-packet link list for the PDU, the intra-packet link list linking multiple TDUs belonging to the PDU, the intra-packet link list having a head pointer to a start address for the intra-packet link list in an inter-packet memory; wherein determining to release the TDU from the SDU buffer is based, in part, on following the intra-packet link list from the start address to the address assigned to the TDU; wherein locating the TSM list comprises reading the TSM entry based on the assigned address.

In an embodiment, the assigned address is the address of a first SDU entry that stores a first SDU of the TDU.

In an embodiment, each logical SDU bank has a corresponding TSM bank in the TSM memory and a corresponding intra-packet bank in the intra-packet linking memory, the method further comprising storing the TSM list in a TSM bank that corresponds to a first logical SDU bank in which a first SDU of the TDU is stored, wherein at least one of the SDUs is stored in a logical SDU bank other than the first logical SDU bank.

In an embodiment, the assigned address is not the address of a first SDU entry that stores a first SDU of the TDU, and the method further comprises: selecting the assigned address from a TDU free list that indicates available addresses within the TSM memory for storing TSM lists; receiving a second TDU belonging to the PDU; based determining that the second TDU is smaller than a maximum SDU size, storing the entire second TDU as a single SDU in a second SDU entry of the SDU buffers; storing an address of the second SDU entry instead of an address of a TSM list at either the end of the intra-packet link list or as a head pointer in the inter-packet link memory.

In an embodiment, the method further comprises: selecting the SDU entries for storing the SDUs, in part, because an SDU free list indicates that the SDU entries are available; removing the SDU entries from the SDU free list upon storing the SDUs; adding the SDU entries back to the SDU free list upon reading or sending the SDUs.

5.0. IMPLEMENTATION MECHANISM—HARDWARE OVERVIEW

According to one embodiment, the techniques described herein are implemented by one or more special-purpose computing devices. The special-purpose computing devices may be desktop computer systems, portable computer systems, handheld devices, networking devices, or any other device that incorporates hard-wired and/or program logic to implement the techniques. The special-purpose computing devices may be hard-wired to perform the techniques, or may include digital electronic devices such as one or more application-specific integrated circuits (ASICs) or field programmable gate arrays (FPGAs) that are persistently programmed to perform the techniques. Such special-purpose computing devices may also combine custom hard-wired logic, ASICs, FPGAs, or other circuitry with custom programming to accomplish the techniques.

Though certain foregoing techniques are described with respect to a hardware implementation, which provides a number of advantages in certain embodiments, it will also be recognized that, in other embodiments, the foregoing techniques may still provide certain advantages when performed partially or wholly in software. Accordingly, in such an embodiment, a suitable implementing apparatus comprises a general-purpose hardware processor and is configured to perform any of the foregoing methods by executing program instructions in firmware, memory, other storage, or a combination thereof.

Figure 13:
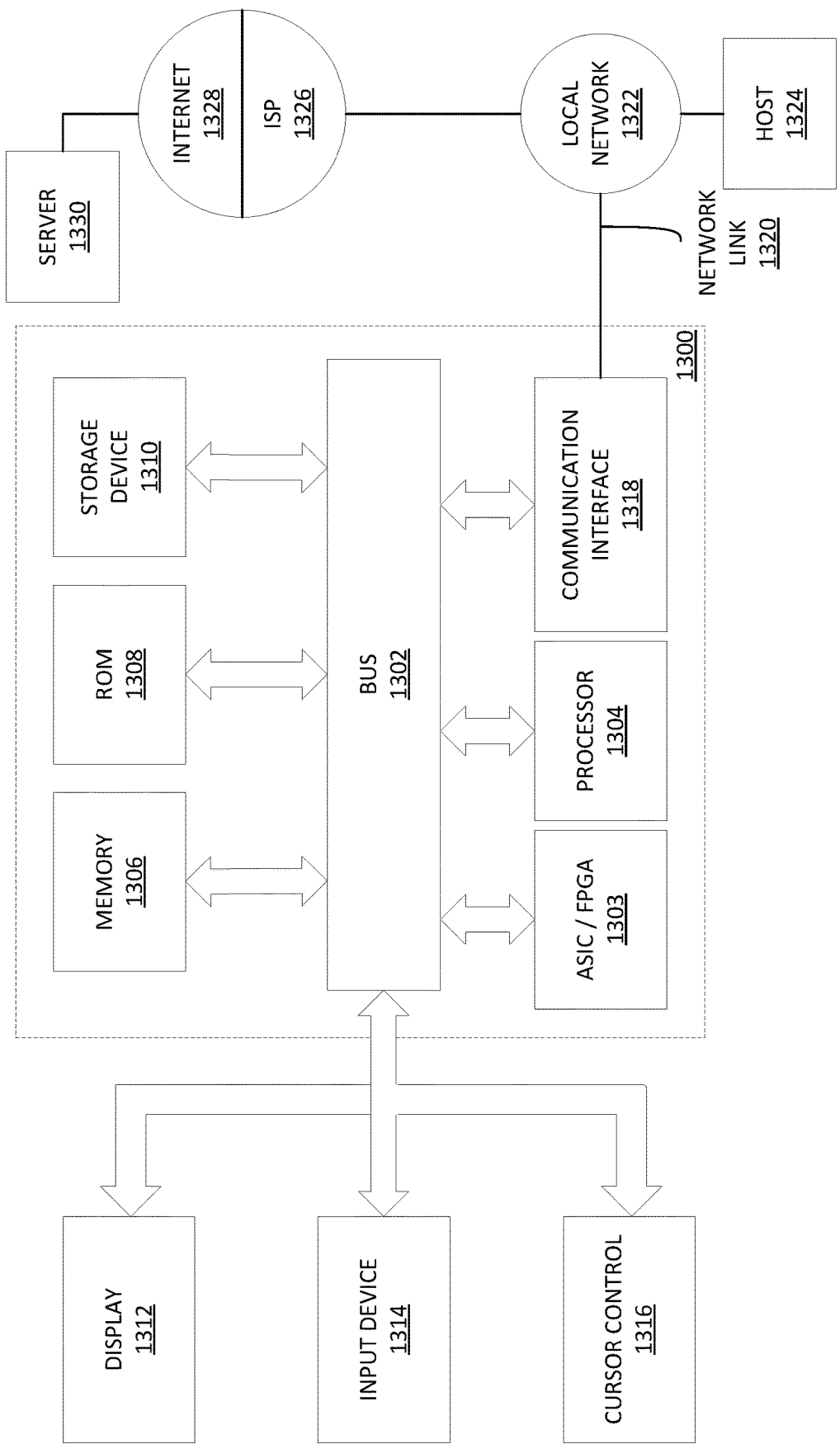
FIG. 13 is block diagram of an example computer system upon which embodiments of the inventive subject matter may be implemented.

FIG. 13 is a block diagram that illustrates an example computer system 1300 that may be utilized in implementing the above-described techniques, according to an embodiment. Computer system 1300 may be, for example, a desktop computing device, laptop computing device, tablet, smartphone, server appliance, computing mainframe, multimedia device, handheld device, networking apparatus, or any other suitable device. In an embodiment, FIG. 13 constitutes a different view of the devices and systems described in previous sections.

Computer system 1300 may include one or more ASICs, FPGAs, or other specialized circuitry 1303 for implementing program logic as described herein. For example, circuitry 1303 may include fixed and/or configurable hardware logic blocks for implementing some or all of the described techniques, input/output (I/O) blocks, hardware registers or other embedded memory resources such as random access memory (RAM) for storing various data, and so forth. The logic blocks may include, for example, arrangements of logic gates, flip-flops, multiplexers, and so forth, configured to generate an output signals based on logic operations performed on input signals.

Additionally, and/or instead, computer system 1300 may include one or more hardware processors 1304 configured to execute software-based instructions. Computer system 1300 may also include one or more busses 1302 or other communication mechanism for communicating information. Busses 1302 may include various internal and/or external components, including, without limitation, internal processor or memory busses, a Serial ATA bus, a PCI Express bus, a Universal Serial Bus, a HyperTransport bus, an Infiniband bus, and/or any other suitable wired or wireless communication channel.

Computer system 1300 also includes one or more memories 1306, such as a RAM, hardware registers, or other dynamic or volatile storage device for storing data units to be processed by the one or more ASICs, FPGAs, or other specialized circuitry 1303. Memory 1306 may also or instead be used for storing information and instructions to be executed by processor 1304. Memory 1306 may be directly connected or embedded within circuitry 1303 or a processor 1304. Or, memory 1306 may be coupled to and accessed via bus 1302. Memory 1306 also may be used for storing temporary variables, data units describing rules or policies, or other intermediate information during execution of program logic or instructions.

Computer system 1300 further includes one or more read only memories (ROM) 1308 or other static storage devices coupled to bus 1302 for storing static information and instructions for processor 1304. One or more storage devices 1310, such as a solid-state drive (SSD), magnetic disk, optical disk, or other suitable non-volatile storage device, may optionally be provided and coupled to bus 1302 for storing information and instructions.

A computer system 1300 may also include, in an embodiment, one or more communication interfaces 1318 coupled to bus 1302. A communication interface 1318 provides a data communication coupling, typically two-way, to a network link 1320 that is connected to a local network 1322. For example, a communication interface 1318 may be an integrated services digital network (ISDN) card, cable modem, satellite modem, or a modem to provide a data communication connection to a corresponding type of telephone line. As another example, the one or more communication interfaces 1318 may include a local area network (LAN) card to provide a data communication connection to a compatible LAN. As yet another example, the one or more communication interfaces 1318 may include a wireless network interface controller, such as a 1302.11-based controller, Bluetooth controller, Long Term Evolution (LTE) modem, and/or other types of wireless interfaces. In any such implementation, communication interface 1318 sends and receives electrical, electromagnetic, or optical signals that carry digital data streams representing various types of information.

Network link 1320 typically provides data communication through one or more networks to other data devices. For example, network link 1320 may provide a connection through local network 1322 to a host computer 1324 or to data equipment operated by a Service Provider 1326. Service Provider 1326, which may for example be an Internet Service Provider (ISP), in turn provides data communication services through a wide area network, such as the world wide packet data communication network now commonly referred to as the "Internet" 1328. Local network 1322 and Internet 1328 both use electrical, electromagnetic or optical signals that carry digital data streams. The signals through the various networks and the signals on network link 1320 and through communication interface 1318, which carry the digital data to and from computer system 1300, are example forms of transmission media.

In an embodiment, computer system 1300 can send and receive data units through the network(s), network link 1320, and communication interface 1318. In some embodiments, this data may be data units that the computer system 1300 has been asked to process and, if necessary, redirect to other computer systems via a suitable network link 1320. In other embodiments, this data may be instructions for implementing various processes related to the described techniques. For instance, in the Internet example, a server 1330 might transmit a requested code for an application program through Internet 1328, ISP 1326, local network 1322 and communication interface 1318. The received code may be executed by processor 1304 as it is received, and/or stored in storage device 1310, or other non-volatile storage for later execution. As another example, information received via a network link 1320 may be interpreted and/or processed by a software component of the computer system 1300, such as a web browser, application, or server, which in turn issues instructions based thereon to a processor 1304, possibly via an operating system and/or other intermediate layers of software components.

Computer system 1300 may optionally be coupled via bus 1302 to one or more displays 1312 for presenting information to a computer user. For instance, computer system 1300 may be connected via an High-Definition Multimedia Interface (HDMI) cable or other suitable cabling to a Liquid Crystal Display (LCD) monitor, and/or via a wireless connection such as peer-to-peer Wi-Fi Direct connection to a Light-Emitting Diode (LED) television. Other examples of suitable types of displays 1312 may include, without limitation, plasma display devices, projectors, cathode ray tube (CRT) monitors, electronic paper, virtual reality headsets, braille terminal, and/or any other suitable device for outputting information to a computer user. In an embodiment, any suitable type of output device, such as, for instance, an audio speaker or printer, may be utilized instead of a display 1312.

One or more input devices 1314 are optionally coupled to bus 1302 for communicating information and command selections to processor 1304. One example of an input device 1314 is a keyboard, including alphanumeric and other keys. Another type of user input device 1314 is cursor control 1316, such as a mouse, a trackball, or cursor direction keys for communicating direction information and command selections to processor 1304 and for controlling cursor movement on display 1312. This input device typically has two degrees of freedom in two axes, a first axis (e.g., x) and a second axis (e.g., y), that allows the device to specify positions in a plane. Yet other examples of suitable input devices 1314 include a touch-screen panel affixed to a display 1312, cameras, microphones, accelerometers, motion detectors, and/or other sensors. In an embodiment, a network-based input device 1314 may be utilized. In such an embodiment, user input and/or other information or commands may be relayed via routers and/or switches on a Local Area Network (LAN) or other suitable shared network, or via a peer-to-peer network, from the input device 1314 to a network link 1320 on the computer system 1300.

As discussed, computer system 1300 may implement techniques described herein using customized hard-wired logic, one or more ASICs or FPGAs 1303, firmware and/or program logic, which in combination with the computer system causes or programs computer system 1300 to be a special-purpose machine. According to one embodiment, however, the techniques herein are performed by computer system 1300 in response to processor 1304 executing one or more sequences of one or more instructions contained in main memory 1306. Such instructions may be read into main memory 1306 from another storage medium, such as storage device 1310. Execution of the sequences of instructions contained in main memory 1306 causes processor 1304 to perform the process steps described herein.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 1310. Volatile media includes dynamic memory, such as main memory 1306. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1302. Transmission media can also take the form of acoustic or light waves, such as those generated during radio-wave and infra-red data communications.

Various forms of media may be involved in carrying one or more sequences of one or more instructions to processor 1304 for execution. For example, the instructions may initially be carried on a magnetic disk or solid state drive of a remote computer. The remote computer can load the instructions into its dynamic memory and use a modem to send the instructions over a network, such as a cable network or cellular network, as modulated signals. A modem local to computer system 1300 can receive the data on the network and demodulate the signal to decode the transmitted instructions. Appropriate circuitry can then place the data on bus 1302. Bus 1302 carries the data to main memory 1306, from which processor 1304 retrieves and executes the instructions. The instructions received by main memory 1306 may optionally be stored on storage device 1310 either before or after execution by processor 1304.

6.0. EXTENSIONS AND ALTERNATIVES

As used herein, the terms "first," "second," "certain," and "particular" are used as naming conventions to distinguish queries, plans, representations, steps, objects, devices, or other items from each other, so that these items may be referenced after they have been introduced. Unless otherwise specified herein, the use of these terms does not imply an ordering, timing, or any other characteristic of the referenced items.

In the drawings, the various components are depicted as being communicatively coupled to various other components by arrows. These arrows illustrate only certain examples of information flows between the components. Neither the direction of the arrows nor the lack of arrow lines between certain components should be interpreted as indicating the existence or absence of communication between the certain components themselves. Indeed, each component may feature a suitable communication interface by which the component may become communicatively coupled to other components as needed to accomplish any of the functions described herein.

In the foregoing specification, embodiments of the inventive subject matter have been described with reference to numerous specific details that may vary from implementation to implementation. Thus, the sole and exclusive indicator of what is the inventive subject matter, and is intended by the applicants to be the inventive subject matter, is the set of claims that issue from this application, in the specific form in which such claims issue, including any subsequent correction. In this regard, although specific claim dependencies are set out in the claims of this application, it is to be noted that the features of the dependent claims of this application may be combined as appropriate with the features of other dependent claims and with the features of the independent claims of this application, and not merely according to the specific dependencies recited in the set of claims. Moreover, although separate embodiments are discussed herein, any combination of embodiments and/or partial embodiments discussed herein may be combined to form further embodiments.

Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A network apparatus comprising:
   network interfaces configured to receive and send data over one or more networks;
   packet processors configured to process data units prior to sending the data units out the network interfaces;
   a traffic manager configured to receive Transport Data Units ("TDUs") destined for particular network interfaces and forward the TDUs to particular packet processors associated with the particular network interfaces;
   a buffer memory system, coupled to the traffic manager, configured to buffer the TDUs received by the traffic manager until the traffic manager is ready to send the TDUs to the particular packet processors, the TDUs divided into Storage Data Units ("SDUs") prior to buffering, the buffer memory system comprising:
      logical SDU banks configured to store the SDUs, each of the logical SDU banks comprising multiple physical SDU banks, each of the physical SDU banks comprising SDU entries, each of the SDU entries configured to store a single SDU;
      a TDU-to-SDU mapping ("TSM") memory storing TSM lists, each TSM list indicating, for a different TDU of the TDUs, addresses of SDU entries that store SDUs that belong to the TDU;
      buffer management logic configured to assign particular SDUs to particular SDU entries and to generate the TSM lists.

2. The network apparatus of claim 1, wherein each of the TDUs belongs to one of a plurality of protocol data unit ("PDUs") received by the network apparatus, a given PDU of the plurality of PDUs having one or more of the TDUs, the buffer memory system further comprising:
   an intra-packet linking memory storing intra-packet link lists, each of the intra-packet link lists linking together a set of TDUs that belong to a same PDU;
   an inter-packet memory storing inter-packet linking data, the inter-packet linking data for a given PDU including one or more head pointers, each of the one or more head pointers pointing to a start of a different intra-packet link list for the PDU;
   wherein the buffer management logic is further configured to generate the intra-packet link lists and inter-packet linking data.

3. The network apparatus of claim 2, wherein each PDU is an Internet Protocol ("IP") packet and each TDU is a cell or a frame.

4. The network apparatus of claim 2,
   wherein the buffer management logic is further configured to, for at least each particular TDU of the TDUs that has more than one SDU:
      assign the particular TDU to a TSM entry in the TSM memory;
      store a particular TSM list for the particular TDU in the assigned TSM entry;
      assign the particular TDU to an intra-packet entry in the intra-packet memory;
      store, in the assigned intra-packet entry, a pointer to an address assigned to a next TDU in a particular intra-packet link list;
      wherein the assigned TSM entry and the assigned intra-packet entry have corresponding addresses.

5. The network apparatus of claim 4, wherein the buffer management logic is further configured to select the corresponding addresses of the assigned TSM entry and the assigned intra-packet entry so as to also correspond to an address of a first SDU entry that stores a first SDU of the particular TDU.

6. The network apparatus of claim 2, wherein each logical SDU bank has a corresponding TSM bank in the TSM memory and a corresponding intra-packet bank in the intra-packet linking memory, wherein each intra-packet link list for a given PDU links TDUs whose assigned TSM entries are in the TSM bank that corresponds to the intra-packet bank in which the intra-packet link list is stored.

7. The network apparatus of claim 4, wherein the buffer management logic is further configured to write an address of an SDU entry instead of an address of a TSM entry in the intra-packet memory or the inter-packet memory when a TDU comprises only a single SDU.

8. A method comprising:
   receiving a Transport Data Unit ("TDU") belonging to a Protocol Data Unit ("PDU");
   dividing the TDU into Storage Data Units ("SDUs");
   buffering the SDUs in SDU entries of an SDU buffer, the SDU buffer comprising logical SDU banks, each of the logical SDU banks comprising multiple physical SDU banks, each of the physical SDU banks comprising a plurality of SDU entries, each of the SDUs stored in a different SDU entry of the SDU entries;
   creating, in a TDU-to-SDU mapping ("TSM") memory, a TSM list for the TDU, the TSM list indicating addresses of the SDU entries;
   determining to release the TDU from the SDU buffer to a packet processor;
   locating the TSM list for the TDU;
   based on the TSM list, locating the SDU entries;
   reading the SDUs from the SDU entries;
   forwarding the SDUs to the packet processor.

9. The method of claim 8, wherein the PDU is an Internet Protocol ("IP") packet and the TDU is a cell or a frame.

10. The method of claim 8, further comprising:
    assigning the TDU to an address of an intra-packet entry in an intra-packet linking memory, the address also corresponding to a TSM entry, in the TSM memory, at which the TSM list is stored;
    adding the assigned address to an intra-packet link list for the PDU, the intra-packet link list linking multiple TDUs belonging to the PDU, the intra-packet link list having a head pointer to a start address for the intra-packet link list in an inter-packet memory;
    wherein determining to release the TDU from the SDU buffer is based, in part, on following the intra-packet link list from the start address to the address assigned to the TDU;
    wherein locating the TSM list comprises reading the TSM entry based on the assigned address.

11. The method of claim 10, wherein the assigned address is the address of a first SDU entry that stores a first SDU of the TDU.

12. The method of claim 10, wherein each logical SDU bank has a corresponding TSM bank in the TSM memory and a corresponding intra-packet bank in the intra-packet linking memory, the method further comprising storing the TSM list in a TSM bank that corresponds to a first logical SDU bank in which a first SDU of the TDU is stored, wherein at least one of the SDUs is stored in a logical SDU bank other than the first logical SDU bank.

13. The method of claim 10, wherein the assigned address is not the address of a first SDU entry that stores a first SDU of the TDU, the method further comprising:

selecting the assigned address from a TDU free list that indicates available addresses within the TSM memory for storing TSM lists;

receiving a second TDU belonging to the PDU;

based on determining that the second TDU is smaller than a maximum SDU size, storing the entire second TDU as a single SDU in a second SDU entry of the SDU buffers;

storing an address of the second SDU entry instead of an address of a TSM list at either the end of the intra-packet link list or as a head pointer in the inter-packet link memory.

14. The method of claim 8, further comprising:

selecting the SDU entries for storing the SDUs, in part, because an SDU free list indicates that the SDU entries are available;

removing the SDU entries from the SDU free list upon storing the SDUs;

adding the SDU entries back to the SDU free list upon reading or sending the SDUs.

15. One or more non-transitory computer-readable media storing instructions that, when executed by one or more computing devices, cause the one or more computing devices to:

receiving a Transport Data Unit ("TDU") belonging to a Protocol Data Unit ("PDU");

dividing the TDU into Storage Data Units ("SDUs");

buffering the SDUs in SDU entries of an SDU buffer, the SDU buffer comprising logical SDU banks, each of the logical SDU banks comprising multiple physical SDU banks, each of the physical SDU banks comprising a plurality of SDU entries, each of the SDUs stored in a different SDU entry of the SDU entries;

creating, in a TDU-to-SDU mapping ("TSM") memory, a TSM list for the TDU, the TSM list indicating addresses of the SDU entries;

determining to release the TDU from the SDU buffer to a packet processor;

locating the TSM list for the TDU;

based on the TSM list, locating the SDU entries;

reading the SDUs from the SDU entries;

forwarding the SDUs to the packet processor.

16. The one or more non-transitory computer-readable media of claim 15, wherein the PDU is an Internet Protocol ("IP") packet and the TDU is a cell or a frame.

17. The one or more non-transitory computer-readable media of claim 15, wherein the instructions, when executed by the one or more computing devices, further cause the one or more computing devices to:

assigning the TDU to an address of an intra-packet entry in an intra-packet linking memory, the address also corresponding to a TSM entry, in the TSM memory, at which the TSM list is stored;

adding the assigned address to an intra-packet link list for the PDU, the intra-packet link list linking multiple TDUs belonging to the PDU, the intra-packet link list having a head pointer to a start address for the intra-packet link list in an inter-packet memory;

wherein determining to release the TDU from the SDU buffer is based, in part, on following the intra-packet link list from the start address to the address assigned to the TDU;

wherein locating the TSM list comprises reading the TSM entry based on the assigned address.

18. The one or more non-transitory computer-readable media of claim 17, wherein the assigned address is the address of a first SDU entry that stores a first SDU of the TDU.

19. The one or more non-transitory computer-readable media of claim 17, wherein each logical SDU bank has a corresponding TSM bank in the TSM memory and a corresponding intra-packet bank in the intra-packet linking memory, the method further comprising storing the TSM list in a TSM bank that corresponds to a first logical SDU bank in which a first SDU of the TDU is stored, wherein at least one of the SDUs is stored in a logical SDU bank other than the first logical SDU bank.

20. The one or more non-transitory computer-readable media of claim 17, wherein the assigned address is not the address of a first SDU entry that stores a first SDU of the TDU, wherein the instructions, when executed by the one or more computing devices, further cause the one or more computing devices to:

selecting the assigned address from a TDU free list that indicates available addresses within the TSM memory for storing TSM lists;

receiving a second TDU belonging to the PDU;

based on determining that the second TDU is smaller than a maximum SDU size, storing the entire second TDU as a single SDU in a second SDU entry of the SDU buffers;

storing an address of the second SDU entry instead of an address of a TSM list at either the end of the intra-packet link list or as a head pointer in the inter-packet link memory.

21. The one or more non-transitory computer-readable media of claim 15, wherein the instructions, when executed by the one or more computing devices, further cause the one or more computing devices to:

selecting the SDU entries for storing the SDUs, in part, because an SDU free list indicates that the SDU entries are available;

removing the SDU entries from the SDU free list upon storing the SDUs;

adding the SDU entries back to the SDU free list upon reading or sending the SDUs.

\* \* \* \* \*